US012798622B2

(12) United States Patent
Cossette et al.

(10) Patent No.: US 12,798,622 B2
(45) Date of Patent: Nov. 17, 2026

(54) PROBABILISTIC COLLISION DETECTION SYSTEM

(71) Applicant: Zoox, Inc., Foster City, CA (US)

(72) Inventors: Charles Champagne Cossette, San Francisco, CA (US); Taylor Scott Clawson, Hyde Park, UT (US); Giacomo Zavolta Taylor, San Francisco, CA (US)

(73) Assignee: Zoox, Inc., Foster City, CA (US)

(*) Notice: Subject to any disclaimer, the term of this patent is extended or adjusted under 35 U.S.C. 154(b) by 227 days.

(21) Appl. No.: 18/395,178

(22) Filed: Dec. 22, 2023

(65) Prior Publication Data

US 2025/0206351 A1 Jun. 26, 2025

(51) Int. Cl.
*B60W 60/00* (2020.01)

(52) U.S. Cl.
CPC ................................ *B60W 60/0027* (2020.02)

(58) Field of Classification Search
None
See application file for complete search history.

(56) References Cited

U.S. PATENT DOCUMENTS 11,195,418 B1* 12/2021 Hong ................ B60W 30/0956
2010/0057361 A1* 3/2010 Caveney ............... B60W 30/08 701/469
2018/0281785 A1* 10/2018 Berntorp ........... B60W 30/0956
2021/0339741 A1* 11/2021 Rezvan Behbahani ...................... B60W 30/0956
2022/0126863 A1* 4/2022 Moustafa .......... B60W 60/0013
(Continued)

FOREIGN PATENT DOCUMENTS

CN 111669150 A * 9/2020 ............. H03H 21/00
CN 114758502 A 7/2022
(Continued)

OTHER PUBLICATIONS

Gabriel R. de Campos, Adam H. Runarsson, Fredrik Granum, Collision avoidance at intersections: A probabilistic threat-assessment and decision-making system for safety interventions, 2014 IEEE 17th International Conference on Intelligent Transportation Systems, p. 649-654 (Year: 2014).*
(Continued)

*Primary Examiner* — Khoi H Tran
*Assistant Examiner* — Dairon Estevez
(74) *Attorney, Agent, or Firm* — Lee & Hayes, P.C.

(57) ABSTRACT

Techniques for determining a collision probability between a candidate trajectory associated with a vehicle and an object (e.g., a vehicle or pedestrian) in the vehicle's environment. In some cases, the techniques include selecting a set of sampled states, where each sampled state represents a predicted state (e.g., a predicted position and/or orientation) of the object at a future time. The set of sampled states may then be used to determine the collision probability. In some cases, the set of sampled states associated with a future time t may be determined based on: (i) a probability distribution (e.g., a Gaussian distribution) associated with the predicted object state at the future time t, and/or (ii) a covariance of the probability distribution. In some cases, the set of sampled states selected based on a distribution includes a set of sigma points each associated with a probability.

20 Claims, 8 Drawing Sheets

(56) References Cited

U.S. PATENT DOCUMENTS

| | | | | |
|---|---|---|---|---|
| 2022/0315047 | A1* | 10/2022 | Probst | B60W 30/16 |
| 2022/0410938 | A1* | 12/2022 | Huang | B60W 60/00256 |
| 2025/0229774 | A1* | 7/2025 | Pei | B60W 50/0097 |

FOREIGN PATENT DOCUMENTS

| | | | | |
|---|---|---|---|---|
| CN | 115556755 | A | 1/2023 | |
| DE | 102008046488 | A1 * | 3/2010 | B60R 21/0134 |
| DE | 102018222542 | A1 * | 6/2020 | B60W 30/0956 |
| KR | 1020200088585 | A | 7/2020 | |
| WO | WO-2022089990 | A1 * | 5/2022 | B60W 30/0953 |

OTHER PUBLICATIONS

M. Parseh and F. Asplund, "Collision Mitigation in the Presence of Uncertainty," 2021 IEEE International Conference on Systems, Man, and Cybernetics (SMC), Melbourne, Australia, 2021, pp. 1655-1662 (Year: 2021).*

Powar, "Calculation of Collision Probability for Autonomous Vehicles using Trajectory Prediction", Retrieved on Nov. 21, 2025 at << https://rucore.libraries.rutgers.edu/rutgers-lib/51437/PDF/1/play/>>, Thesis, Oct. 2016, pp. 20-24, 38-52, 59-60 and figures 3.11-4.7.

Search Report and Written Opinion for International Application No. PCT/US24/60649, dated Nov. 20, 2025, 13 pages.

* cited by examiner

FIG. 6.0

PROBABILISTIC COLLISION DETECTION SYSTEM

BACKGROUND

Safety of passengers in a vehicle and other people or objects in proximity to the vehicle is of the utmost importance. Such safety is often predicated on an accurate detection of a potential collision and timely deployment of a safety measure. While autonomous vehicles are often implemented with systems that have highly effective collision detection systems, these systems may be inoperable or ineffective on rare occasions. For instance, an error may develop in a relatively long, and potentially complex, processing pipeline for a system on a vehicle, causing the vehicle to maneuver in an unsafe manner. Additionally, computational resources may limit the ability to fully account for evolution of environmental states which, in turn, may also have an impact on the safe operation of such vehicles.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
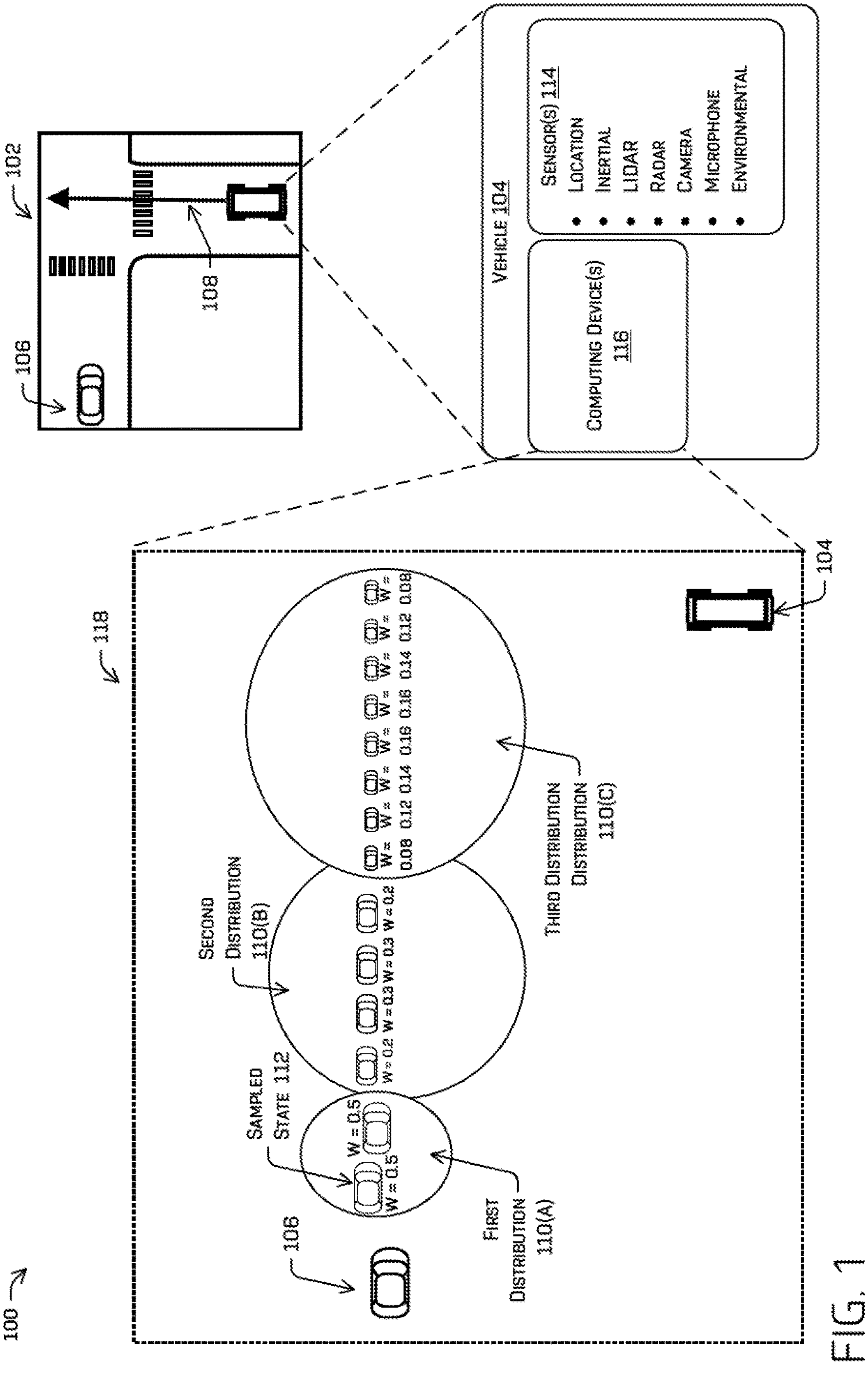
FIG. 1 depicts an example architecture for performing at least some of the techniques described herein.

Techniques for determining a collision probability between a candidate trajectory associated with a vehicle and an object (e.g., a vehicle or pedestrian) in the vehicle's environment are described herein. In some cases, the techniques described herein include determining a set of estimated states for one or more instances in time, where a sampled state of the set represents a predicted state (e.g., a predicted position and/or orientation) of the object at a future time which, in some examples, is determined in accordance with an evolution of a probabilistic model. The set of sampled states may then be used to determine the collision probability. For example, given a set of N sampled states, if M of those N sampled states are associated with collision of the vehicle's candidate trajectory, then the collision probability may be determined based on the M colliding sampled states and the N sampled states (e.g., based on a ratio of a sum of probability(s) associated with the M colliding sampled states and a sum of probabilities associated with the N sampled states). In some cases, the set of sampled states associated with a future time t may be determined based on: (i) a probability distribution (e.g., a Gaussian probability distribution) associated with the predicted object state at a future time t, and/or (ii) a covariance of the probability distribution. For example, in some cases, a set of N sampled states are selected from the probability distribution, where the value of N may be determined based on a level of uncertainty, a covariance measure, or other information associated with the probability distribution. In some cases, the set of sampled states selected based on a distribution includes a set of sigma points associated with an unscented transform. In some such examples, the sigma points may be determined in accordance with a Gauss-Hermite scheme or otherwise.

In some cases, to determine a probability of collision between a vehicle's candidate trajectory and an object at a future time t, the following operations may be performed: (i) determining a probability distribution associated with the predicted object state at future time t, (ii) determining a set of N sampled states associated with the probability distribution, (iii) for each of the N sampled states, determining whether the sampled state is predicted to lead to collision with the candidate trajectory, and (iv) determining the collision probability based on a subset of the N sampled states that are predicted to lead to collision with the candidate trajectory. In some cases, a sampled state associated with the future time t is predicted to lead to collision with a vehicle's candidate trajectory if at least one of the following conditions is satisfied: (i) a first region associated with (e.g., a first ellipse around) a position of the sampled state in the vehicle's environment and a second region associated with (e.g., a second ellipse around) a position of the candidate trajectory at future time t intersect, or (ii) the sampled state is determined to be a predicted extension of a sampled state associated with a time prior to future time t, where the prior sampled state is determined to be colliding with the candidate trajectory at the prior time. In various examples, a buffer may be added (either static, based on relative distance, based on relative velocity, etc.) to provide an additional level of safety when computing if a collision occurs. In some cases, a sampled state associated with a future time t is predicted to avoid collision with a vehicle's candidate trajectory if at least one of the following conditions is satisfied: (i) a first region associated with (e.g., a first ellipse around) a position of the sampled state in the vehicle's environment and a second region associated with (e.g., a second ellipse around) a position of the candidate trajectory at time future time t do not intersect, (ii) the sampled state is determined to not be a predicted extension of any "colliding" sampled states associated with prior times (e.g., any sampled states associated with prior times that were determined to be colliding with the candidate trajectory at those prior times), or (iii) a distance associated with a position of the sampled state in the vehicle's environment and a position of the candidate trajectory at future time t exceeds a threshold.

In some cases, the techniques described herein select sampled states associated with two or more future times and use the temporal relationship between those times to propagate collision predictions from one timestep to another. For example, in some cases, given a set of T futures times, an example system: (i) determines T probability distributions, with each one of the T probability distributions being associated with a respective one of the T future times and representing a distribution of the predicted object state and the respective future time; (ii) determines T sampled state sets, with each one of the T sampled state sets being associated with a respective one of the T future times and being determined based on the respective probability distribution for the respective future time, (iii) for each sampled state that is associated with a future time t, determining whether the sampled state is predicted to collide with a vehicle's candidate trajectory at time t, including based on determining whether the sampled state is a predicted extension of a sampled state associated with a time prior to t that is predicted to collide with the candidate trajectory at the prior time; and (iv) determine one or more collision probabilities (e.g., a single collision probability for the T future times, T collision probabilities each associated with one of the T future times, and/or the like) based on the collision predictions determined at operation (iii). Various methods may be used to propagate such uncertainties forward in time, such as, for example, using extended Kalman filters, unscented Kalman filters, and the like.

In some cases, the sampled states determined based on a probability distribution associated with a future time t are associated with a set of sigma points, such as a set of sigma points associated with an unscented Kalman filter technique and indicative of one or more characteristics of the associated probability distribution. A sigma point may be associated with a probability that represents a computed likelihood of the real-world occurrence of the respective sample point as determined based on the distribution. In some cases, given a set of N sigma points is associated with a future time t, where each sigma point is associated with a respective probability, then the collision probability determined based on the N sampled states may be determined based on a ratio of: (i) the sum of probabilities associated with a subset of the N sampled states that are predicted to lead to collision with a vehicle's candidate trajectory at t, and (ii) the sum of probabilities associated with the N sampled states.

In some cases, the techniques described herein include determining a probability distribution (e.g., a Gaussian probability distribution) associated with a predicted state of an object at a future time. In some cases, given T future times, T respective probability distributions may be determined, where each of the T probability distributions may be associated with a predicted object state at a respective future time. For example, a first probability distribution may be determined for future time T1, a second probability distribution may be determined for future time T2, and so on. In some cases, the probability distribution(s) associated with predicted object state(s) may be determined using a Kalman filter technique. In some cases, given T future times, a sequence of T probability distributions are determined. A probability distribution may be associated with a set of parameters. The set of parameters may include a set of sampled states and/or a set of sigma points determined based on the distribution.

For example, in some cases, a Kalman filter may be utilized to propagate a current probability distribution associated with an object state forward in time to determine a predicted distribution at each future time step. The Kalman filter may incorporate one or more models of object motion to estimate the evolution of the uncertainty about the predicted object state across time, for example based on sensor data (e.g., perception data) determined by one or more sensors associated with the vehicle. In some cases, the Kalman filter process may determine a covariance measure associated with a distribution that represents a measure of uncertainty associated with the distribution. In some cases, given a sequence of T distributions associated with a sequence of T increases, the sequence of the T respective covariances associated with the sequence of T distributions increases, such that the covariance of the first distribution in the sequence is lower than the covariance of the second distribution in the sequence, the covariance of the second distribution in the sequence is lower than the covariance of the third distribution in the sequence, and so on. As further described below, in some cases, the covariance of a distribution may be used to determine the size of the set of sampled states determined based on that distribution.

In some cases, techniques described herein include determining a set of sampled states based on a distribution. In some cases, given a set of (e.g., a sequence of) T distributions, T sets of sampled states are determined, where each set of sampled state is determined based on one of the T distributions. A sampled state may represent a sampled object state determined based on a distribution associated with a predicted object state. For example, a sampled state may represent a sigma point. As described above, in some cases, a sampled state and/or a sigma point may be associated with a respective probability.

In some cases, determining a set of sampled states associated with a probability distribution includes determining (e.g., based on a covariance measure associated with the sampled state) a number of sigma points and/or sampled state sets to use for collision checking purposes. In some cases, P may represent a count of "sampling orders." A sampling order may represent at least one of: (i) a count of sampled states in a sampled set state, or (ii) a distribution of probabilities associated with the sampled states in the sampled state set. For example, in some cases, a sampled state set with a sampling order of one may include $2^1$ sampled states, a sampled state set with a sampling order of two may include $2^2$ sampled states, a sampled state set with a sampling order of three may include $2^3$ sampled states, and so on.

In some cases, the system may determine a number of sampled states to use for collision checking purposes for a given time based on, for example, an uncertainty, covariance, etc. associated with the object the given time. In those examples in which the covariance is low, a small number of samples may be chosen whereas in those examples in which the covariance is high, a larger number may be selected.

In some cases, a sampled state set associated with a particular sampling order (e.g., numerosity of sigma points) is determined in a manner such that the distance between each successive pair of sampled states in the sampled state set is uniform across the sampled state set. For example, given a sampled state set with four sampled states (e.g., a sampled state set with a sampling order of two, hence with $2^2$ sampled states), the four sampled states may be determined such that the distance between the first and the second sampled states, the distance between the second and the third sampled states, and the distance between the third and the fourth sampled states is uniform. As another example, given a sampled state set with eight sampled states (e.g., a sampled state set with a sampling order of three, hence with $2^3$ sampled states), the eighth sampled states may be determined such that the distance between the first and the second sampled states, the distance between the second and the third sampled states, the distance between the third and the fourth sampled states, the distance between the fourth and the fifth sampled states, the distance between the fifth and the sixth sampled states, the distance between the sixth and the seventh sampled states, and the distance between the seventh and the eighth sampled states is uniform.

Therefore, in some cases, each sampling state set is determined based on a delta value that represents a uniform distance between each successive pair of sampled states in the sampling state set. For example, a sampling state set associated with a sampling order of two may be associated with a delta value that represents the uniform distance between the first and the second sampled states, the second and the third sampled states, and the third and the fourth sampled states. As another example, a sampling state associated with a sampling order of three may be associated with a delta value that represents the uniform distance between the first and the second sampled states, the second and the third sampled states, the third and the fourth sampled states, the fourth and the fifth sampled states, the fifth and the sixth sampled states, the sixth and the seventh sampled states, and the seventh and the eighth sampled states.

In some cases, the sampling order associated with a sampled state set may be used to determine the probabilities and/or weights associated with the sampled states in the sampled state set. In some cases, the probability associated with a sampled state is determined based on a measure of probability density associated with a region of a corresponding distribution, where the region is determined based on the sampled state. For example, in some cases, the probability determined for a sampled state set associated with the sampling order of one is determined based on a probability density associated with a first portion (e.g., a first half of a defined interval) of the distribution in which the sampled state falls. As another example, in some cases, the probability determined for a sampled state set associated with the sampling order of one is determined based on a probability density associated with a first sub-portion (e.g., a first half) of the first portion. As another example, in some cases, the probability determined for a sampled state associated with the sampling order of one is determined based on a first sub-sub-portion (e.g., a first half of) of the first sub-portion. In some cases, determining probabilities in this manner has the effect that: (i) each sampled state in a lower-order sampled state set is the direct parent of a group of (e.g., two) sampled states in a higher-order sampled state set, and (ii) the probability determined for a direct parent sampled state equals the sum of the probabilities determined for the direct children sampled states.

For example, given a probability distribution N(0,1), the probability determined for an ith sampled state in a sequence of sampled states determined based on the probability distribution and in relation to a pth sampling order may be determined based on $$w_{i,p} = \int_{s_{i,p}-\frac{\Delta}{2}}^{s_{i,p}+\frac{\Delta}{2}} N(0, 1)\partial x,$$

where Δ may be the delta value (e.g., the uniform distance value) associated with the sampled state set, and $s_{i,p}$ is the ith sampled state in the sequence of sampled states determined in relation to the pth sampling order. In some cases, determining the probabilities for sampled states in this manner has the effect that, for example, $w_{0,p}=w_{0,p+1}+w_{1,p+1}$. Such probabilities, or weights, may, in turn, be used to scale the determination of a collision such that the collision probability is determined based on a sum of products of the weights and the associated collision determination.

In some cases, because different sampling orders require different counts of sampled states, different sampled state sets associated with different sampling orders will have different counts of sampled states. This may enable an example system to choose which of the sampled state sets to choose for collision prediction. In some cases, based on a covariance associated with a corresponding distribution, the system may select which of the sampled state sets to choose for collision detection. For example, in some cases, if the covariance measure associated with a first distribution is lower than the covariance measure associated with a second distribution, the system may determine to perform collision prediction with respect to the first distribution based on a sampled state set having a first sampling order and with respect to the second distribution based on a sampled state set having a second sampling order, where the second sampling order may be higher than the first sampling order. Accordingly, in some cases, after determining P sampled state sets based on a distribution, the system may select which one of those sampled state sets to use for collision prediction purposes, where this selection decision may be based on a covariance measure associated with the distribution. In at least some such examples, mappings may be precomputed such that when a collision is detected in a smaller set (e.g., fewer points/samples/sigma points, etc.), the collision may be efficiently mapped to the next larger set. In various examples, such mapping may be based on, for example, a next-nearest-neighbor determination.

In some cases, the techniques described herein relate to determining whether a sampled state associated with a particular future time is predicted to collide with a vehicle's candidate trajectory at the particular future time. In some cases, determining whether such a sampled state is predicted to collide with the candidate trajectory at the particular future time may be based on at least one of: (i) whether a first region associated with a location of the sampled state and a second region associated with a location of the candidate trajectory at the particular future time intersect, (ii) whether the sampled state is a predicted extension of a sampled state associated with a previous time that was predicted to collide with the candidate trajectory at the previous time, or (iii) whether a distance between a first position associated with the sampled state and a second position associated with the candidate trajectory at the particular future time exceeds a threshold. The first technique is referred to herein as the "geometric intersection" technique, the second technique is referred herein to as the "predicted extension" technique, and the third technique is referred to herein as the "distance filtering" technique. Aspects of these three techniques are described in greater detail below.

In some cases, the geometric intersection technique may include determining whether a first region associated with a position of a sampled state in a vehicle's environment intersects with a second region associated with a position of the vehicle's candidate trajectory at a future time associated with the sampled state. In some cases, to process a sampled state in accordance with the geometric intersection technique, an example system: (i) determines a first position (e.g., an environment location) associated with the sampled state, (ii) determines a second position associated with the candidate trajectory at a corresponding future time (e.g., a second position, such as an environment location, representing where the vehicle would be at the future time if the vehicle follows the candidate trajectory), (iii) determines a first region associated with (e.g., a first ellipse around) the first position, (iv) determines a second region associated with (e.g., a second ellipse around) the second position, and (v) determines whether the first and second regions intersect. In some cases, based on determining that the first and second regions intersect, the system conclusively determines that the sampled state is predicted to collide with the trajectory at the corresponding future time. In some cases, based on determining that the first and second regions fail to intersect, the system conclusively determines that the sampled state is predicted to not collide with the trajectory at the corresponding future time.

In some cases, the geometric intersection technique is performed based on a first region associated with a sampled state being processed and a second region associated with an expected vehicle position given a candidate trajectory being evaluated. In some cases, at least one of (e.g., both of) the regions are ellipses. The regions may represent threshold probabilities. In some cases, the area of the two regions (e.g., the two ellipses) may be the same or may be different. In some cases, the area of at least one of the two regions (e.g., at least one of the two ellipses) may be determined based on a covariance measure associated with the probability distribution used to determine the sampled state. For example, in some cases, if a first distribution associated with a first covariance measure that is lower than a covariance measure associated with a second distribution, then if a first sampled state determined based on the first distribution and a second sampled state determined based on the second distribution are processed using the geometric intersection technique, then the region(s) used for processing the first sampled state may have a smaller area relative to the region(s) used for processing the second sampled state.

In some cases, before a sampled state is processed using the geometric intersection technique to determine whether the sampled state is predicted to lead to collision with a vehicle's candidate trajectory at a corresponding time, an example system may first perform at least one of the following: (i) process the sampled state using the predicted extension technique to determine that the sampled state is not a predicted extension of a sampled state associated with a prior time that is predicted to lead to collision at the prior time, or (ii) process the sampled state using the distance filtering technique to determine that a distance associated with a position of the sampled state and a position of the candidate trajectory at the corresponding time does not exceed a threshold. This conditional processing of the sampled state using the geometric intersection technique may be performed because the geometric intersection technique is expected to be more resource intensive (e.g., more computationally complex) and/or slower than the predicted extension technique and/or the distance filtering technique. Accordingly, in some cases, prior to processing the sampled state using the more resource intensive and/or the slower geometric intersection technique, the system may determine that no conclusive determination about whether the sampled state is colliding can be reached using a less resource intensive and/or faster technique (e.g., using one or both of the predicted extension technique or the distance filtering technique).

In some cases, the predicted extension technique may include determining whether a first sampled state associated with a particular time is a predicted extension of a second sampled state associated with a prior time, where the second sampled state is (e.g., was previously) determined to be colliding (e.g., determined to be colliding with the vehicle's candidate trajectory at the prior time). In some cases, to process a sampled state in accordance with the predicted extension technique, an example system: (i) determines a set of colliding sampled states associated with one or more prior times that were determined to be colliding, and (ii) for each colliding sampled state, determine whether the sampled state is a predicted extension of the colliding sampled state. In some cases, based on determining that the sampled state is a predicted extension of a colliding sampled state, the system conclusively determines that the sampled state is colliding (e.g., predicted to lead to collision with the vehicle's trajectory at the corresponding time). In some cases, based on determining that the sampled state is not a predicted extension of any colliding sampled states, the system fails to make a conclusive determination about whether the sampled state is predicted to lead to collision (e.g., which may trigger processing the sampled state using any collision prediction technique, such as using the geometric intersection technique and/or using the distance filtering technique described above).

In some cases, the predicted extension technique requires determining whether a first sampled state associated with a given future time is a predicted extension of a second sampled state associated with a prior future time. In some cases, such a determination may be based on: (i) the amount of time lapse between the two future times, (ii) a first position associated with the first sampled state and/or a second position associated with the second sampled state, (iii) an object velocity associated with the second sampled state, (iv) a heading associated with the second sampled state, and/or (v) an orientation associated with the second sampled state. In some cases, to determine whether the first sampled state is a predicted extension of the second sampled state, an example system: (i) determines a predicted object position at the given future time given the time lapse amount, the velocity at the prior future time, the second position, the orientation associated with the second sampled state, and/or the heading associated with the second sampled state, and (ii) determines whether the first position is within a threshold distance of the predicted object position. In some cases, the threshold distance is determined based on a first covariance measure associated with a first distribution used to determine the first sampled state and/or a second covariance measure associated with a second distribution used to determine the second sampled state (e.g., based on a deviation of the first and second covariance measures).

In some cases, to process a sampled state in accordance with the predicted extension technique, an example system: (i) determines that a sampled state associated with a first time is predicted to lead to collision with the vehicle's candidate trajectory at the first time, and (ii) propagates this prediction to one or more times after the first time (e.g., determines that any sampled states associated with one or more times after the first time that are within threshold distance(s) of predicted object position(s) at the one or more subsequent times given the sampled state are colliding). In some cases, the predicted extension technique is a powerful collision prediction technique because this technique enables cross-temporally propagating collision predictions across time, thus in some cases substantially reducing complexity associated with cross-temporal collision prediction.

In some cases, the distance filtering technique may include determining whether a distance associated with the first position of a sampled state and a second position of a vehicle's trajectory at a corresponding time falls below a threshold. In some cases, to process the sampled state using the distance filtering technique, an example system: (i) determines a first position associated with the candidate trajectory at a corresponding future time (e.g., a second position, such as an environment location, representing where the vehicle would be at the future time if the vehicle follows the candidate trajectory), (ii) determines a second position associated with the sampled state, and (iii) determines a distance associated with the first position and the second position exceeds a threshold. For example, the system may determine the distance based on whether the second position falls inside a region of the environment associated with (e.g., a circle around) the first position. In some cases, a parameter (e.g., a radius) of the region (e.g., a circular region) may be determined based on a covariance measure associated with a corresponding distribution, such that a first sampled state determined based on a first distribution having a lower covariance measure may be associated with a smaller region relative to a second sampled state determined based on a second distribution having a higher covariance measure. In some cases, the area of the region is determined in a manner such that, when a sampled state falls outside the region, the sampled state is guaranteed to be non-colliding. In some cases, based on determining that the second position falls outside the region associated with the first position, the system determines that the distance associated with the two positions fails exceeds the threshold. In some cases, based on determining that the second position falls inside the region associated with the first position, the system determines that the distance associated with the two positions fails to exceed the threshold.

Accordingly, in some cases, the distance filtering technique may determine whether a sampled state is colliding based on whether a distance associated with the first position of the sampled state and a second position of a vehicle's trajectory at a corresponding time falls below a threshold. In some cases, based on determining that the distance exceeds the threshold, an example system determines that the sampled state is not colliding (e.g., because the sampled state is too far away from a predicted vehicle position given the candidate trajectory. In some cases, based on determining that the distance fails to exceed the threshold, the system fails to make a conclusive determination about whether the sampled state is predicted to lead to collision (e.g., which may trigger processing the sampled state using any collision prediction technique, such as using the geometric intersection technique and/or using the predicted extension technique described above). In at least some examples, such a distance may be determined such that a probability is below a threshold. As a non-limiting example of which, the distance may be determined as the distance from a centroid of the Gaussian representing the object such that the object has a 99.9% probability of being within the contour associated with the distance. Of course, any other metric or value is contemplated and the above is used for illustrative purposes only.

In some cases, the distance filtering technique is a powerful collision prediction technique because this technique may enable reaching a conclusive non-collision prediction about a batch of distant sampled states. In this way, the distance filtering technique may in some cases substantially reduce computational complexity of performing cross-temporal collision prediction (e.g., continuous cross-temporal prediction).

In some cases, the techniques described herein include determining one or more collision probability about whether a vehicle's candidate trajectory is predicted to collide with an object in the vehicle's environment. In some cases, an example system determines at least one of the following: (i) a collision probability about whether the candidate trajectory is predicted to collide with the object over a set of (e.g., a sequence of) future times, (ii) a collision probability about whether the candidate trajectory is predicted to collide with the object over a specific time.

In some cases, to determine a collision probability associated with a specific time, an example system may: (i) determine a set of sampled states determined based on the distribution associated with the specific time that have been used for collision prediction (e.g., the sampled state set for which a conclusive collision prediction is reached has been determined), (ii) determine a colliding subset of the set (e.g., including those sampled states in the set that are predicted to lead to collision with the candidate trajectory at the specific time), (iii) determine a first sum of probabilities associated with the sampled states in the set and/or a numerosity of states in the samples states (e.g., a sum of one), (iv) determine a second sum of probabilities associated with the colliding subset which, in some instances, may be scaled by the probability/weights discussed in detail herein, and (v) determine the collision probability associated with the specific time based on the first and second sum (e.g., based on a ratio of the second sum over the first sum). In some cases, based on determining that the collision probability exceeds a threshold (e.g., a threshold determined based on a covariance measure associated with the distribution associated with the specific time), the system determines that the object is predicted to collide with the candidate trajectory at or before the specific time. In some cases, based on determining that the collision probability fails to exceed a threshold (e.g., a threshold determined based on a covariance measure associated with the distribution associated with the specific time), the system determines that the object is not predicted to collide with the candidate trajectory at the specific time.

In some cases, to determine a collision probability associated with a set of (e.g., a sequence of) T times that are associated with T distributions and T sampled state sets that have been used for collision prediction, an example system may: (i) determine a first sum of probabilities associated with the T sampled state sets, (ii) determine a second sum of probabilities associated with a colliding subset of the T sampled state sets, (iii) determine the collision probability associated with the T times based on the first and second sum (e.g., based on a ratio of the second sum over the first sum). In some cases, based on determining that the collision probability exceeds a threshold (e.g., a threshold determined based on a covariance measure associated with the distribution associated with the specific time), the system determines that the object is predicted to collide with the candidate trajectory during the T times. In some cases, based on determining that the collision probability fails to exceed a threshold (e.g., a threshold determined based on a covariance measure associated with the distribution associated with the specific time), the system determines that the object is predicted to avoid collision during the T times.

In some cases, to determine a collision probability associated with a set of (e.g., a sequence of) T times, an example system may determine whether the vehicle's candidate trajectory is predicted to be in collision with an object of interest at least a threshold number (e.g., at least one of) the T times. In some cases, based on determining that the vehicle's candidate trajectory is predicted to be in collision with the object of interest at least a threshold number (e.g., at least one of) the T times, the system determines that the T times are associated with a collision probability representing that the T times are colliding in relation to the candidate trajectory being evaluated. In some cases, based on determining that the vehicle's candidate trajectory is not predicted to be in collision with the object of interest at least a threshold number (e.g., at least one of) the T times, the system determines that the T times are associated with a collision probability representing that the T times are non-colliding in relation to the candidate trajectory being evaluated.

Accordingly, in some cases, the techniques described herein enable determining at least one of: (i) a probability that a candidate trajectory collides with an object over a future period, (ii) a probability that a candidate trajectory first collides with an object in a specific future time, or (iii) a probability that the candidate trajectory is in collision with an object in a specific future time. These techniques may be used by a planning component of a vehicle (e.g., an autonomous vehicle) to determine whether to adopt a candidate trajectory for controlling the vehicle and/or to determine whether to modify a candidate trajectory and use this modified trajectory for controlling the vehicle or otherwise implement safety mechanisms. Additionally or alternatively, the techniques described herein may enable a validation component that is configured to determine whether a candidate trajectory generated by another component (e.g., a planning component) is safe (e.g., is collision-proof). For example, the validation component may use the techniques described herein to determine whether to adopt a candidate trajectory for controlling the vehicle and/or to determine whether to modify a candidate trajectory and use this modified trajectory for controlling the vehicle. The techniques described herein may enable determining a cost associated with a trajectory based on whether the trajectory is predicted to collide with an object in a vehicle environment.

In some cases, the techniques described herein may be implemented in the context of a vehicle including a primary system for generating data to control the vehicle and a secondary system that validates the data and/or other data to avoid collisions. For example, the primary system may localize the vehicle, detect an object around the vehicle, segment sensor data, determine a classification of the object, predict an object trajectory, generate a trajectory for the vehicle, and so on. The secondary system may independently localize the vehicle, detect an object around the vehicle, predict an object trajectory, evaluate a trajectory generated by the primary system, and so on. In examples, the secondary system may also monitor components of the vehicle to detect an error. If the secondary system detects an error with a trajectory generated by the primary system and/or an error with a component of the vehicle, the secondary system may cause the vehicle to perform a maneuver, such as decelerating, changing lanes, swerving, etc. In examples, the secondary system may send information to the primary system (e.g., information regarding a potential collision). In many examples, the techniques discussed herein may be implemented to avoid a potential collision with an object around the vehicle. Of course, though described herein as a primary and secondary system, the techniques described may be implemented in any number of systems and subsystems in order to verify controls, provide high integrity algorithms, and redundant processes for safe control.

The primary system may generally perform processing to control how the vehicle maneuvers within an environment. The primary system may implement various Artificial Intelligence (AI) techniques, such as machine learning, to understand an environment around the vehicle and/or instruct the vehicle to move within the environment. For example, the primary system may implement the AI techniques to localize the vehicle, detect an object around the vehicle, segment sensor data, determine a classification of the object, determine an object track, generate a trajectory for the vehicle, and so on. In one example, the primary system generates a primary trajectory for controlling the vehicle and a secondary, contingent trajectory for controlling the vehicle, and provides the primary trajectory and the secondary trajectory to the secondary system. The contingent trajectory may control the vehicle to come to a stop and/or to perform another maneuver (e.g., lane change, etc.).

The secondary system may generally evaluate the primary system using at least a subset of data (e.g., sensor data) made available to the primary system. The secondary system may use similar techniques as used in the primary system to verify outputs of the primary system and/or use dissimilar techniques to ensure consistency and verifiability of such outputs. In examples, the secondary system may include a localizer to independently localize the vehicle by determining a position and/or orientation (together a pose) of the vehicle relative to a point and/or object in an environment where the vehicle is located. The secondary system may also include a perceiver to detect an object around the vehicle, determine a track for the object, predict a trajectory for the object, and so on. The secondary system may include a monitor component to monitor one or more components of the vehicle to detect an error with the one or more components. Further, the secondary system may include a trajectory manager to use data from the localization component, the perceiver, and/or the monitor component of the secondary system to evaluate a trajectory of the vehicle provided by the primary system and/or determine a trajectory to use to control the vehicle. The secondary system may also include a drive manager (and/or a system controller(s)) to receive a trajectory from the trajectory manager and control the vehicle based on the trajectory. Exemplary operations of the secondary system are described in US Patent Application Publication No. 20200211394, entitled "Collision Avoidance System," which is incorporated by reference herein in its entirety and for all purposes.

In some cases, the techniques and/or systems discussed herein may enhance the safety of passengers in a vehicle and/or other individuals in proximity to the vehicle. For example, a second component may detect a triggering event associated with a trajectory provided by a first component and control a vehicle to safely decelerate, stop, and/or perform another maneuver to avoid a collision. In some cases, the second component may operate relatively independently from the first component, so that another form of evaluation occurs to avoid a collision. For instance, the second component may independently detect an object in proximity to the vehicle and/or evaluate a trajectory generated by the first component. Further, in some cases, the second component may be a higher integrity (e.g., more verifiable) and/or less complex system than the first component. For instance, the second component may be designed to process less data, include a shorter processing pipeline than the first component, operate according to techniques that are more easily verifiable than the techniques of the first component, and so on.

In some cases, the techniques described herein increase the redundancy of a vehicle computing device by equipping the device with two components for trajectory validation. In some cases, if one of those components fails, the other can take over, which increases the reliability of the vehicle computing device. This redundancy approach provides an additional layer of safety and continuity in the trajectory validation process. If a safety condition is detected or if a trajectory needs to be verified, both trajectory validation components work in parallel to independently assess and validate the trajectory. This simultaneous validation process increases the system's confidence in the accuracy and reliability of the trajectory, as any discrepancies or inconsistencies between the two components can be detected and resolved. Moreover, in the event of a failure in one of the components, the remaining component can continue performing trajectory validation without interruption, ensuring the vehicle's operations remain secure and unaffected by the failure.

The methods, apparatuses, and systems described herein may be implemented in a number of ways. Example implementations are provided below with reference to the following figures. Although discussed in the context of an autonomous vehicle, in some examples, the methods, apparatuses, and systems described herein may be applied to a variety of systems. In another example, the methods, apparatuses, and systems may be utilized in an aviation or nautical context. Additionally, or alternatively, the techniques described herein may be used with real data (e.g., captured using sensor(s)), simulated data (e.g., generated by a simulator), or any combination thereof.

FIG. 1 depicts an example architecture 100 for performing at least some of the techniques described herein. As depicted in FIG. 1, the architecture includes a vehicle 104 with sensor(s) 114 and the computing device(s) 116. As further depicted in FIG. 1, the vehicle 104 is in an environment 102 with an object 106. While the example object depicted in FIG. 1 is another vehicle, a person of ordinary skill in the relevant technology will recognize that the object may be a non-vehicular object, including a non-vehicular dynamic object such as a pedestrian.

According to the techniques discussed herein, data gathered by the vehicle 104 may include sensor data from sensor(s) 114 of the vehicle 104. For example, the sensor(s) 114 may include a location sensor (e.g., a global positioning system (GPS) sensor), an inertia sensor (e.g., an accelerometer sensor, a gyroscope sensor, etc.), a magnetic field sensor (e.g., a compass), a position/velocity/acceleration sensor (e.g., a speedometer, a drive system sensor), a depth position sensor (e.g., a lidar sensor, a radar sensor, a sonar sensor, a time of flight (ToF) camera, a depth camera, and/or other depth-sensing sensor), an image sensor (e.g., a camera), an audio sensor (e.g., a microphone), and/or environmental sensor (e.g., a barometer, a hygrometer, etc.). The sensor(s) 114 may generate sensor data, which may be received by computing device(s) 116 associated with the vehicle 104. However, in other examples, some or all of the sensor(s) 114 and/or computing device(s) 116 may be separate from and/or disposed remotely from the vehicle 104 and data capture, processing, commands, and/or controls may be communicated to/from the vehicle 104 by one or more remote computing devices via wired and/or wireless networks.

As depicted in FIG. 1, the computing device(s) may perform operations associated with the routine 118. The routine 118 may be configured to determine whether the candidate trajectory 108 collides with the object 106. The routine 118 may further include determining whether to modify the candidate trajectory 108 and determining to control the vehicle 104 based on the modified trajectory. The candidate trajectory 108 may, for example, be determined by a planning component of the computing device(s) 116 of the vehicle 104.

As further depicted in FIG. 1, the routine 118 includes determining a set of probability distributions, such as a first distribution 110(A), a second distribution 110(B), and a third distribution 110(C). A probability distribution may represent a predicted future state (e.g., position and/or orientation) of the object 106 at a future time. Each probability distribution may be associated with a respective future time. For example, the first distribution 110(A) may be associated with a first time, the second distribution 110(B) may be associated with a second time that follows the first time, and the third distribution 110(C) may be associated with a third time that follows the first and second times. In some cases, the routine 118 includes determining a continuous sequence of probability distributions. In some cases, the routine 118 includes determining a discrete sequence of probability distributions. In some cases, the set of probability distributions determined using the routine 118 are determined using a Kalman filter process (such as an unscented Kalman filter). Initial covariances and states associated with the object may be provided by one or more other systems of the vehicle as described herein (e.g., perception outputs, prediction outputs, etc.) or heuristically determined/set. Regardless, such filtering operations may also model the behavior of the object and the model may be dependent on a classification of the object (e.g., a different model may be implemented for propagating a vehicle as opposed to a pedestrian).

As further depicted in FIG. 1, the routine 118 further includes determining a sampled state set based on each probability distribution in the set of probability distributions. For example, the first distribution 110(A) is used to determine two sampled states (including sampled state 112), the second distribution 110(B) is used to determine four sampled states, and the third distribution 110(C) is used to determine eight sampled states. In some cases, each sampled state is a sigma point that is associated with a probability distribution and with the filter. Sigma points may be used to determine a probability that represents a computed likelihood of the real-world occurrence of the respective sample point as determined based on the distribution. FIG. 1 depicts that each sampled state is associated with a respective probability. For example, the sampled state 112, which is determined based on the first distribution 110(A), is associated with a probability of 0.4.

A sampled state generated by the routine 118 may be used to determine whether the sampled state is predicted to collide with the candidate trajectory 108. This determination may be based on at least one of: (i) whether a region associated with the sampled state intersects with a region associated with the candidate trajectory 108 at a time associated with the sampled state, (ii) whether a distance associated with a position of the sampled state and a position of the candidate trajectory 108 at the time associated with the sampled state exceeds a threshold, or (iii) whether the sampled state is a predicted extension of a sampled state associated with a prior time that was predicted to collide with the candidate trajectory 108. For example, in some cases, the determination about whether the sampled state 112 is predicted to collide with the candidate trajectory 108 may be based on at least one of: (i) whether a region associated with the sampled state 112 intersects with a region associated with the candidate trajectory 108 at a time associated with the sampled state 112, (ii) whether a distance associated with a position of the sampled state 112 and a position of the candidate trajectory 108 at the time associated with the sampled state 112 exceeds a threshold.

Figure 2:
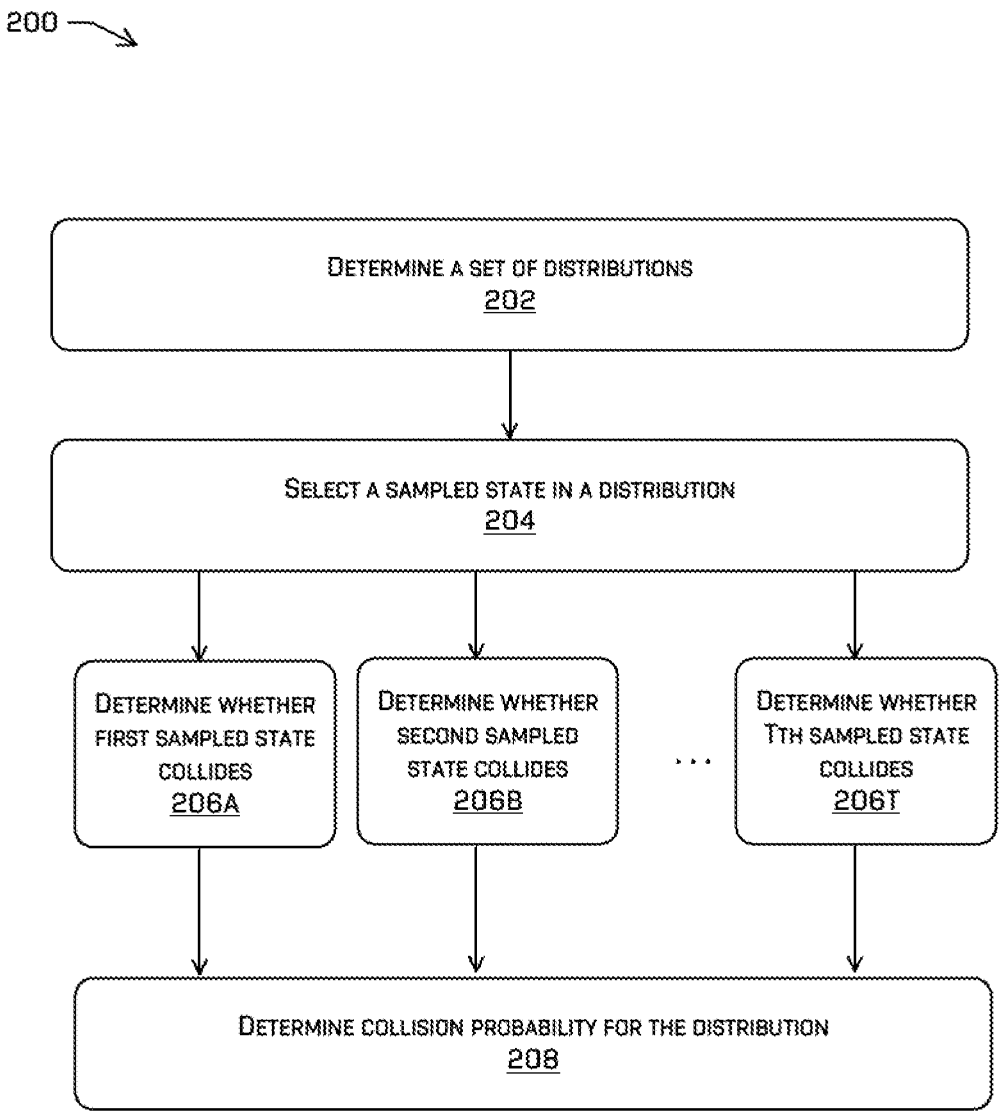
FIG. 2 is a flowchart diagram of an example process for cross-temporal propagation of a collision prediction.

FIG. 2 is a flowchart diagram of an example process 200 for cross-temporal propagation of a collision prediction. As depicted in FIG. 2, at operation 202, an example system determines a set (e.g., a sequence) of T distributions. A probability distribution may represent a predicted future state (e.g., position and/or orientation) of an object at a future time. Each probability distribution may be associated with a respective one of T future times. A probability distribution may be associated with a set of parameters. The set of parameters may include a set of sampled states and/or a set of sigma points.

At operation 204, the system selects P sampled states in a tth distribution associated with a tth time. The system may first identify a distribution (e.g., a distribution associated with a non-final time in the sequence of T distributions). The system may then determine a covariance measure associated with the distribution (e.g., based on the output of a Kalman filter process used to determine the first distribution). The system may then use the covariance measure to select a number, P, of sampled states for collision prediction and then select one of the sampled states in the first distribution.

At operations 206A-206T, the system determines, for each sampled state, whether the selected sampled state collides with a candidate trajectory. The system may determine whether a sampled state: (i) has a distance in relation to a predicted state (e.g., a predicted position) of the vehicle at the tth and according to the candidate trajectory that exceeds a threshold, (ii) is a predicted continuation of a sampled state from a distribution associated with a time before the tth time that was determined to collide with the candidate trajectory at that prior time, and/or (iii) collides a region associated with a predicted state (e.g., a predicted position) of the vehicle at the tth time associated with the sampled state. In some cases, the predicted vehicle state may be determined based on the candidate trajectory. Accordingly, at operation 206A, the system determines whether a first sampled state collides with the candidate trajectory; at operation 206B, the system determines whether a second sampled state collides with the candidate trajectory; and at operation 206T, the system determines whether a tth sampled state collides with the candidate trajectory.

At operation 208, the system determines a collision probability associated with the tth time based on any colliding sampled states. In some cases, the system determines an instantaneous collision probability based on (e.g., a ratio of) the sum of the weights associated with the colliding sampled states and a total sum of the weights associated with the tth distribution. In some cases, the system determines an incremental collision probability based on (e.g., a ratio of): (i) the sum of weights associated with sampled states that are predicted to be colliding at the tth time but were not previously determined to be colliding at a prior time, (ii) and a total sum of the weights associated with the tth distribution. In some cases, the system determines a cumulative collision probability based on (e.g., a ratio of): (i) the sum of weights associated with sampled states that are predicted to be colliding at the tth time and/or at a prior time, (ii) and a total sum of the weights associated with the tth distribution.

Figure 3:
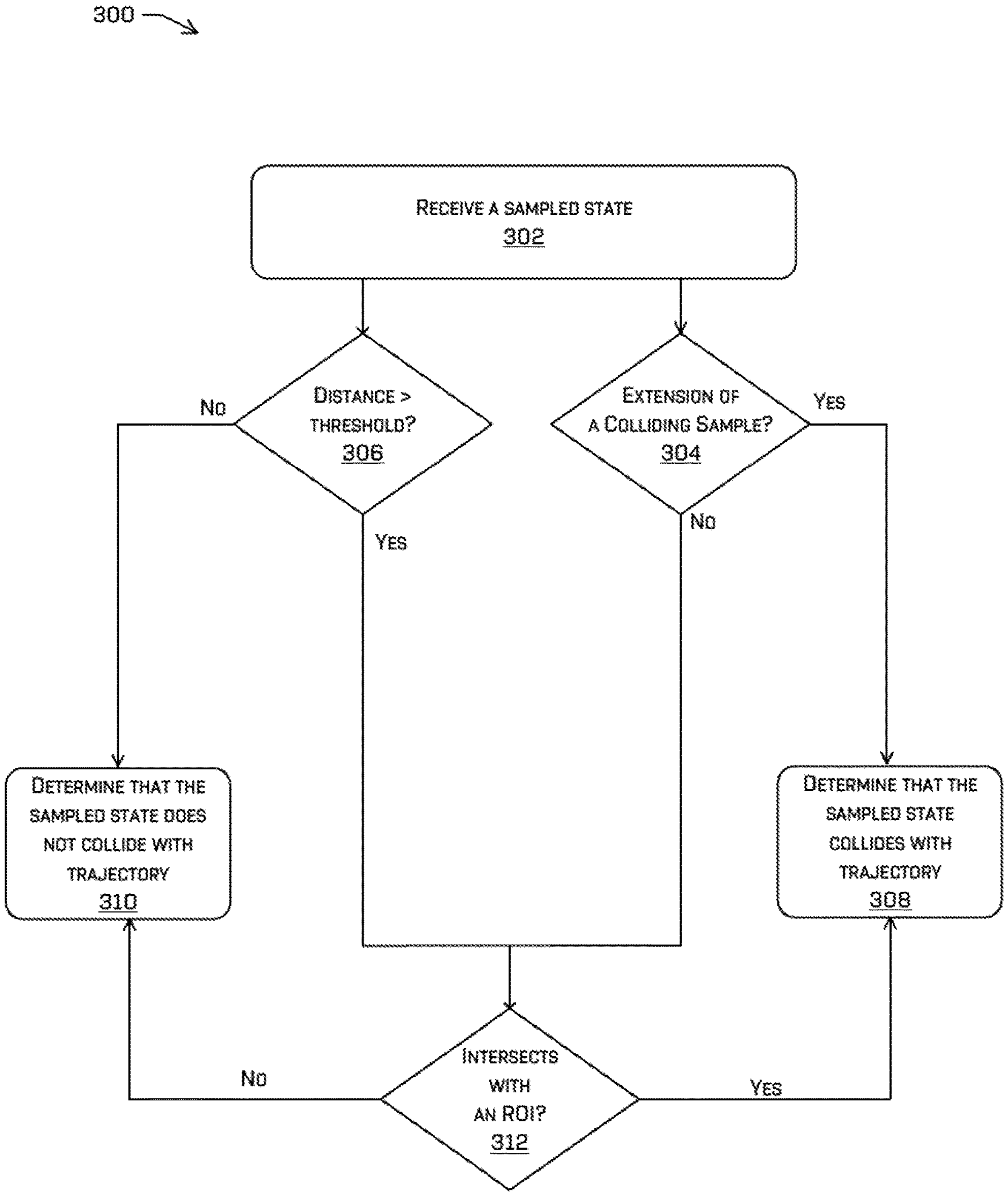
FIG. 3 is a flowchart diagram of an example process for determining whether a target sampled state collides with a candidate trajectory at a target future time.

FIG. 3 is a flowchart diagram of an example process 300 for determining whether a sampled state collides with a candidate trajectory at a future time associated with the sampled state. As depicted in FIG. 3, at operation 302, an example system may receive the target sampled state. The sampled state may be a sigma point, such as a sigma point determined using an unscented Kalman filter technique. A sigma point may represent a sample point determined based on a probability distribution in order to capture one or more key statistical probabilities of the distribution.

At operation 304, the system determines whether a sampled state is a predicted extension of a colliding sampled state from a previous time into the target future time. In some cases, the system determines whether: (i) the sampled state is a predicted extension of a prior sampled state associated with a prior time into the target future time, and (ii) the sampled state was predicted to collide with a candidate trajectory at the prior time. In some cases, determining that the target sampled state is a predicted extension of the prior sampled state may be based on a time lapse between the times associated with those two sampled states, a velocity associated with the prior sampled state, a heading associated with the prior sampled state, and/or a position associated with the target sampled state. For example, consider a prior sampled state S1 associated with time T1 that was predicted to collide with the candidate trajectory. If S1 has a position P1, velocity V1, and heading H1, then to determine whether a sampled state S2 with position P2 at time T2 is a predicted extension of S1, the system may use: (i) a time difference between T2 and T1, and (ii) an expected change in position from S1 to S2 based on the velocity V1 and heading H1 of S1 over the (T2−T1) time difference. Therefore, in some cases, the system can propagate a colliding sampled state associated with a first time into a future time based on the position, heading, and/or velocity associated with the sampled. In some cases, the system determines a probability that a subsequent sampled state is a predicted extension of a prior sampled state, and determines that the subsequent sampled state is a predicted extension of the prior sampled state if the probability exceeds a threshold. In some cases, the system determines a region around a predicted position of a prior sampled state in a subsequent time, and then determines that a sampled state associated with the subsequent time is a predicted extension of the prior state if the subsequent state falls within the determined region.

If the system determines that the target sampled state is a predicted extension of a colliding sampled state from a prior time (operation 304—Yes), the system proceeds to operation 308 to determine that the sampled state collides with the candidate trajectory at the target future time. In some cases, based on determining that the target sampled state is a predicted extension of a prior sampled state with a definitive collision conclusion, the system propagates this definitive collision conclusion to the target sampled state (e.g., to enable cross-temporal propagation of collision predictions).

If the system determines that the target sampled state is not a predicted extension of a colliding sampled state from a prior time (operation 304—No), the system proceeds to operation 312 to determine whether a region associated with the target sampled state intersects with a target region associated with the candidate trajectory in relation to the target time. In some cases, based on failing to determine that the target sampled state is a predicted extension of a prior sampled state with a definitive collision conclusion, the system fails to reach a definitive collision prediction and proceeds to perform a subsequent collision check based on a different collision prediction technique that can produce a definitive prediction.

At operation 306, the system determines whether a distance associated with a first position of the target sampled state and a second position of the candidate trajectory in relation to the target time exceeds a threshold. For example, the system may determine whether the second position falls outside of a region (e.g., a circle) around the first position. While the example implementation depicted in FIG. 3 depicts operation 304 and operation 306 as being performed in parallel and/or independently, a person of ordinary skill in the relevant technology will recognize that in some implementations operation 304 and operation 306 may be performed sequentially and/or conditioned on one another (e.g., operation 304 may be performed based on determining that the distance associated with the first and second positions fails to exceed a threshold, operation 306 may be performed based on determining that the target sampled state is not a predicted extension of a prior colliding sampled state, and/or the like). In some cases, operation 306 is performed before operation 304, such that if the distance associated with the target sampled state and a predicted vehicle position at the corresponding time exceeds a threshold, operations 304, 306-312 are not performed.

If the system determines that the distance associated with a first position of the target sampled state and a second position of the candidate trajectory in relation to the target time exceeds a threshold (operation 306—Yes), the system proceeds to operation 310 to determine that the sampled state does not collide with the candidate trajectory at the target future time. In some cases, based on determining that the distance is sufficiently large, the system reaches a definitive conclusion that the target sampled state is non-colliding with the candidate trajectory and in relation to the target time.

If the system determines that the distance associated with a first position of the target sampled state and a second position of the candidate trajectory in relation to the target time fails to exceed a threshold (operation 306—No), the system proceeds to operation 312 to determine whether a region associated with the target sampled state intersects with a target region associated with the candidate trajectory in relation to the target time. One or both of the regions may be an ellipse. In some cases, based on determining that the target sampled state is not too distant from the candidate trajectory in relation to the target time, the system fails to reach a definitive collision prediction and proceeds to perform a subsequent collision check based on a different collision prediction technique that can produce a definitive prediction.

At operation 312, if the system determines that the region associated with the target sampled state intersects with the target region associated with the candidate trajectory in relation to the target time (operation 312—Yes), the system proceeds to operation 308 to conclude that the sampled state collides with the candidate trajectory. However, if the system determines that the region associated with the target sampled state does not with the target region associated with the candidate trajectory in relation to the target time (operation 312—No), the system proceeds to operation 310 to determine that the sampled state does not collide with the vehicle.

Figure 4:
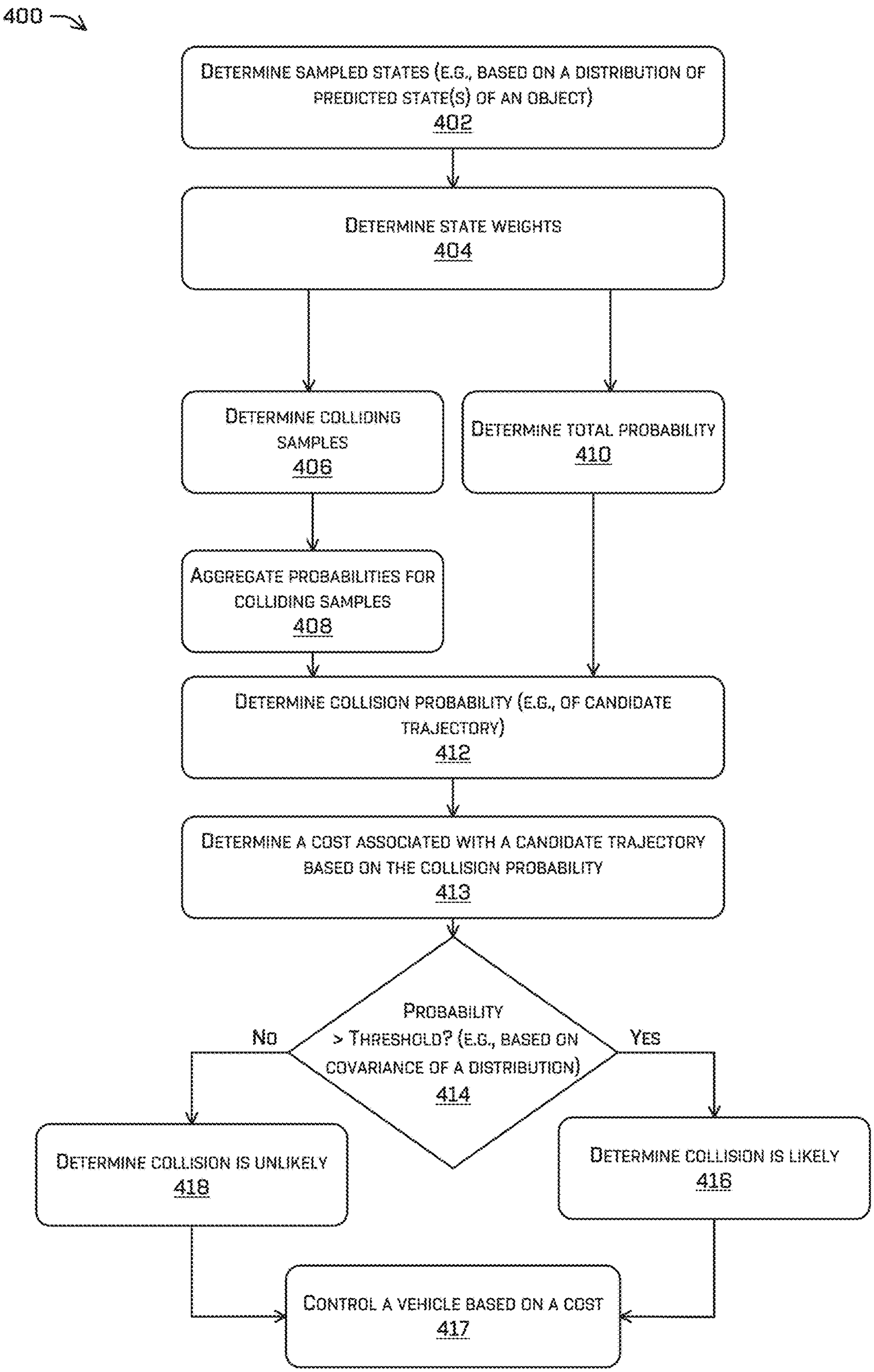
FIG. 4 is a flowchart diagram of an example process for determining whether a candidate trajectory is predicted to collide with an object at a target future time.

FIG. 4 is a flowchart diagram of an example process 400 for determining whether a candidate trajectory is predicted to collide with an object at a target future time. As depicted in FIG. 4, at operation 402, an example system determines a set of sampled states associated with the target future time. In some cases, the system determines the set of sampled states based on a distribution associated with the target future time, where the distribution may be associated with a predicted state of the object at the target future time. In some cases, the count of the set of sampled states is determined based on a covariance measure associated with the target future time.

At operation 404, the system determines a set of probabilities associated with the set of sampled states. A probability associated with a sampled state may represent a likelihood of real-world occurrence of the sampled state (e.g., a likelihood that the object will be at the corresponding position and/or orientation at the target time) and/or a deviation of the sampled state from a mean of a distribution associated with the probability distribution. The set of sampled states may include a set of sigma points and the set of probabilities may include probabilities associated with the set of sigma points.

At operation 406, the system determines a colliding subset of sampled states that are predicted to lead to collision with the candidate trajectory at the target future time. In some cases, determining whether a sampled state is predicted to collide with the candidate trajectory at the target future time may be based on at least one of: (i) whether a first region associated with a location of the sampled state and a second region associated with a location of the candidate trajectory at the target future time intersect, (ii) whether the sampled state is a predicted extension of a sampled state associated with a previous time that was predicted to collide with the candidate trajectory at the previous time, or (iii) whether a distance between a first position associated with the sampled state and a second position associated with the candidate trajectory at the target future time exceeds a threshold.

At operation 408, the system determines the sum of probabilities associated with the colliding subset. The system may iteratively process the set of sampled states and, based on determining during one iteration that a corresponding sampled state is predicted to collide with the candidate trajectory, adjust a colliding probability sum based on the corresponding sampled state's sum.

At operation 410, the system determines a total probability based on a sum of probabilities associated with the set of sampled states. In some cases, the total probability may be a value that is determined after determining the set of sampled states (e.g., during determination of P sampled state sets, where P may be a count of sampling orders associated with the target future time).

At operation 412, the system determines a collision probability associated with the target future time. The system may determine the collision probability based on the collision probability determined at operation 408 and the total probability determined at operation 410. For example, the system may determine the collision probability associated with the target future time based on a ratio of the collision probability and (e.g., over) the total probability.

At operation 414, the system determines whether the collision probability associated with the target future time exceeds a threshold. The threshold may be determined based on a covariance of a distribution associated with the target future time. For example, the threshold may be lower for future times that are associated with distributions having higher covariances. If the system determines that the collision probability associated with the target future time exceeds the threshold (operation 414—Yes), the system proceeds to operation 416 to determine that the candidate trajectory is predicted to collide with the object at the target future time. If the system determines that the collision probability associated with the target future time fails to exceed the threshold (operation 414—No), the system proceeds to operation 418 to determine that the candidate trajectory is predicted to avoid collision with the object at the target future time.

Figure 5:
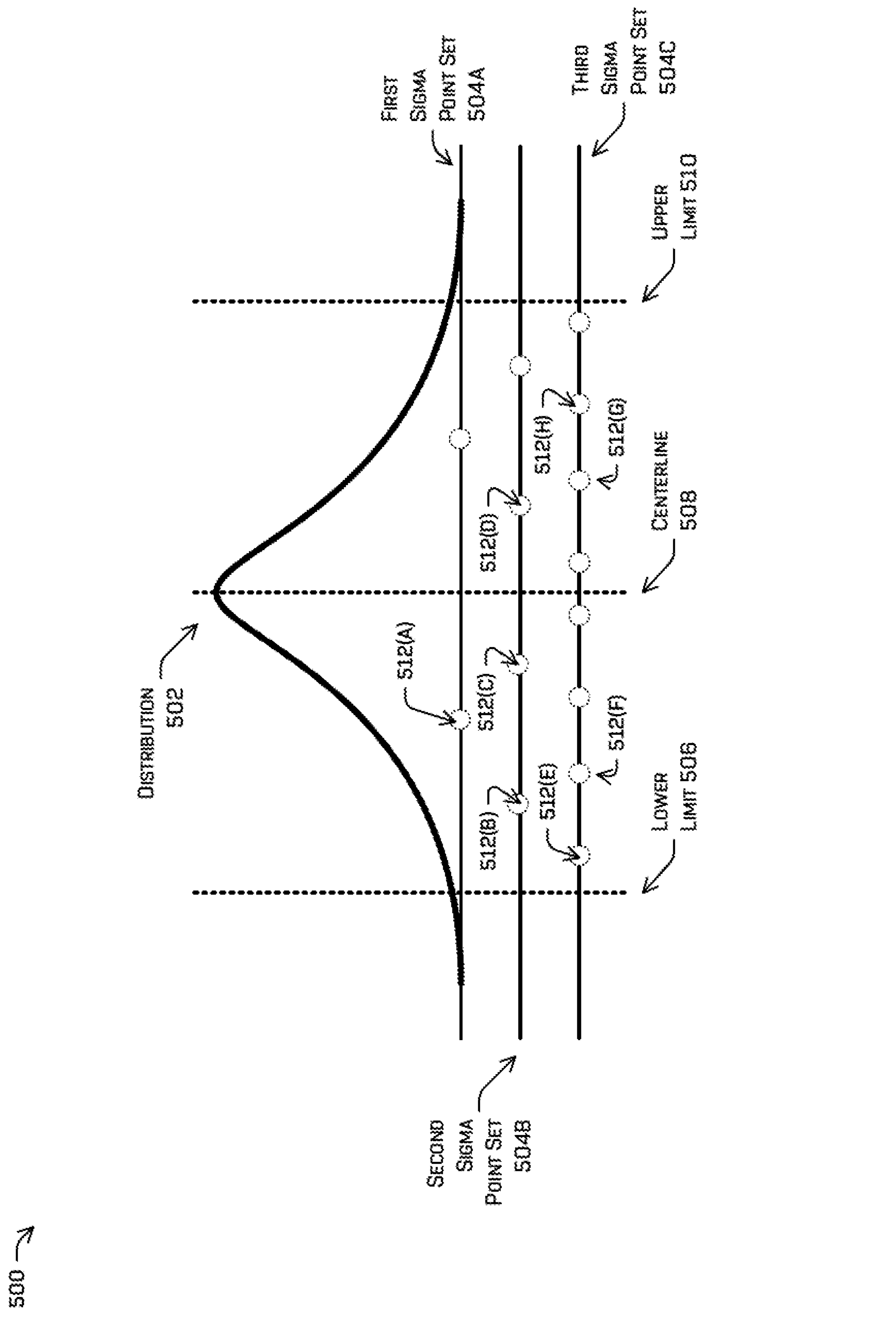
FIG. 5 provides an operational example of generating three sets of sigma points based on a probability distribution.

FIG. 5 provides an operational example 500 of generating three sets of sigma points based on a probability distribution 502. The probability distribution 502 may be associated with a predicted state of an object at a corresponding future time. The three sets of sigma points include the first sigma point set 504A, the second sigma point set 504B, and the third sigma point set 504C.

The first sigma point set 504A may be associated with a sampling order of one that may require sampling two sampled states based on the probability distribution 502. The second sigma point set 504B may be associated with a sampling order of two that may require sampling four sampled states based on the probability distribution 502. The third sigma point set 504C may be associated with a sampling order of three that may require sampling eight sampled states based on the probability distribution 502. Accordingly, each successive sigma point set may include a count of sigma points that is determined by multiplying the count of sigma points in the preceding sigma point set by two.

As depicted in FIG. 1, at each sampling order level, the corresponding sigma point set is determined between a lower limit 506 and an upper limit 510. The lower limit 506 and/or the upper limit 510 may be determined by removing a first ratio of lower-side outliers and/or a second ratio of upper-side outliers from the portion of the probability distribution 502 that may be used for generating state samples. In some cases, lower limit 506 and/or the upper limit 510 may be determined based on a first number of standard deviations to the left of and/or to the right of the mean of the probability distribution 502.

As further depicted in FIG. 1, each sigma point set may be associated with a uniform distance between successive pairs of sigma points. For example, the distance between sigma point 512(B) and sigma point 512(C) may be the same as the distance between the sigma point 512(C) and sigma point (D). As another example, the distance between sigma point 512(E) and sigma point 512(F) may be the same as the distance between the sigma point 512(G) and 512(H).

In FIG. 1, the probability of a parent sigma point may equal the sum of the probabilities of the children of that sigma point. For example, while the probability of sigma point 512(A) may be the area under the curve from the lower limit 506 to the centerline 508, this probability may equal the combined probability of sigma point 512(B) and sigma point 512(C). As another example, the probability of the sigma point 512(B) may equal the combined probability of the sigma point 512(E) and the sigma point 512(F).

While FIG. 5 depicts an example technique for determining sampled states associated with a one-dimensional distribution, the techniques can be extended to determining sampled states associated with distributions with more than one dimension. For example, with respect to a two-dimensional distribution, a system may determine M*N sigma points by sampling (e.g., using the one-dimensional sampling techniques depicted in FIG. 5) a vector of M points with M corresponding weights in one dimension (e.g., in the horizontal dimension) and a vector N points with N corresponding weights in the other dimension (e.g., the vertical dimension). The system may determine two-dimensional sampled states based on the two sets of points, for example by performing a cross-product of the two vectors. Accordingly, given a point $x_i$ sampled in one dimension and another point $y_j$ in the other dimension, the two-dimensional sampled state $(x_i, y_i)$ may be determined. The weight of the sampled state $(x_i, y_i)$ may be determined based on (e.g., based on a product) of the weight associated with $x_i$ and the weight associated with $y_j$.

Figure 6:
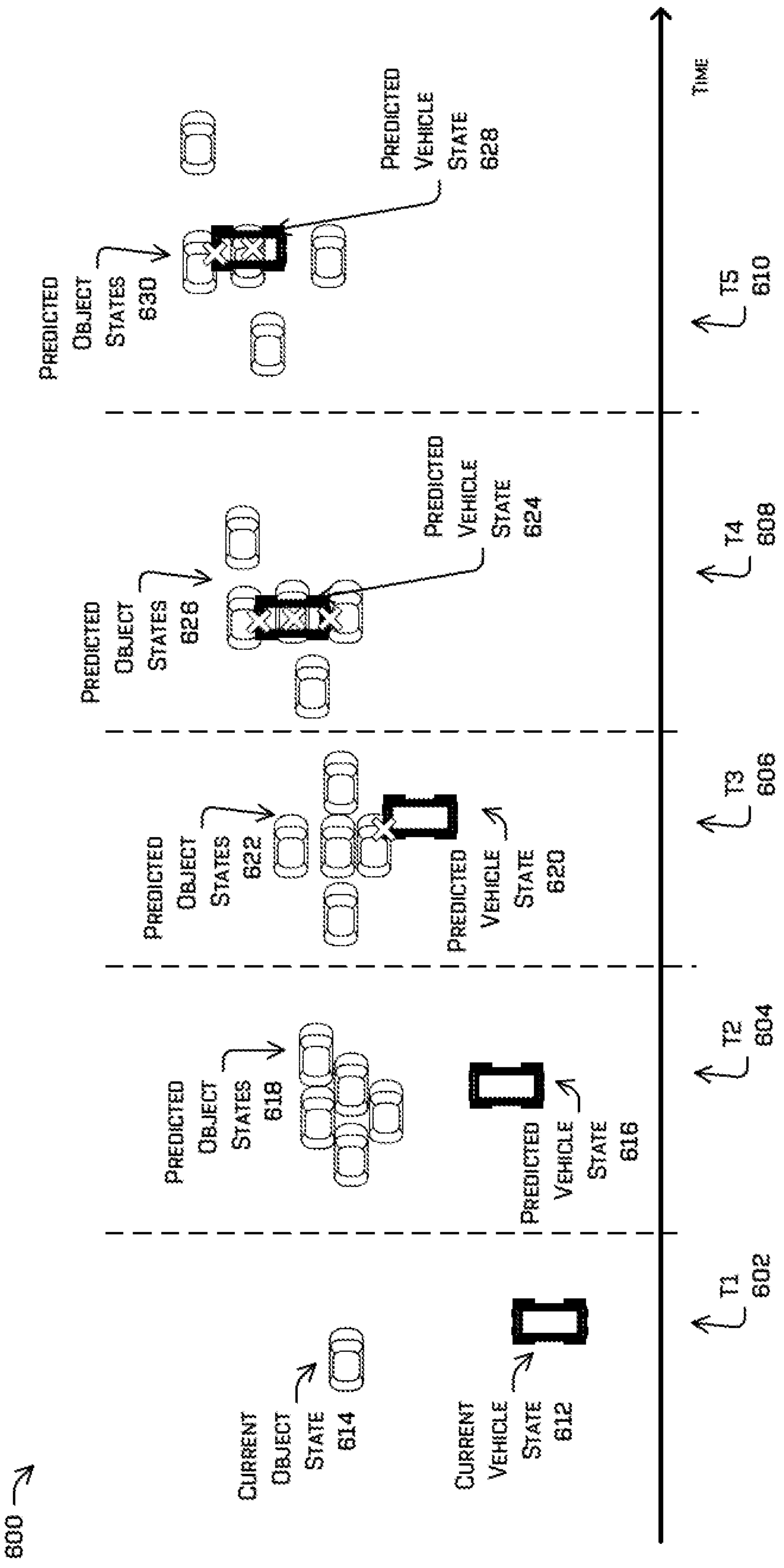
FIG. 6 provides an operational example of determining collision probabilities across time.

FIG. 6 provides an operational example 600 of determining collision probabilities across five times. As depicted in FIG. 6, at time T1 602, because the current vehicle state 612 does not collide with the current object state 614, an instantaneous collision probability of zero is determined. Moreover, because no previous collisions between the object and the vehicle have been detected, an incremental collision probability of zero is determined. Furthermore, because the highest instantaneous collision probability up to time T1 602 is zero, a cumulative collision probability of zero is determined.

At time T2 604, because the predicted vehicle state 616 does not collide with any of the predicted object states 618, an instantaneous collision probability of zero is determined. Moreover, because no previous collisions between the object and the vehicle have been detected, an incremental collision probability of zero is determined. Furthermore, because the highest instantaneous collision probability up to time T2 604 is zero, a cumulative collision probability of zero is determined.

At time T3 606, because the predicted vehicle state 620 collides with one of the five predicted object states 622, an instantaneous collision probability of 1/5 is determined. Moreover, because no previous collisions between the object and the vehicle have been detected, the incremental collision probability equals the ratio of colliding predicted object states associated with the time T3, which is 1/5. Furthermore, because the highest instantaneous collision probability up to time T3 606 is 1/5, a cumulative collision probability of 1/5 is determined.

At time T4 608, because the predicted vehicle state 624 collides with three of the five predicted object states 626, an instantaneous collision probability of 3/5 is determined. However, because one of the three colliding states is a continuation of a predicted object state that was determined to be colliding previously at time T2 604, an incremental collision probability of (3−1)/5=2/5 is determined. Moreover, because the highest instantaneous collision probability up to time T4 608 is 3/5, a cumulative collision probability of 3/5 is determined.

At time T5 610, because the predicted vehicle state 628 collides with two of the five predicted object states 630, an instantaneous collision probability of 2/5 is determined. However, because one of the three colliding states is a continuation of a predicted object state that was determined to be colliding previously at time T3 606, an incremental collision probability of (2−1)/5=1/5 is determined. Moreover, because the highest instantaneous collision probability up to time T5 610 is 3/5, a cumulative collision probability of 3/5 is determined.

Figure 7:
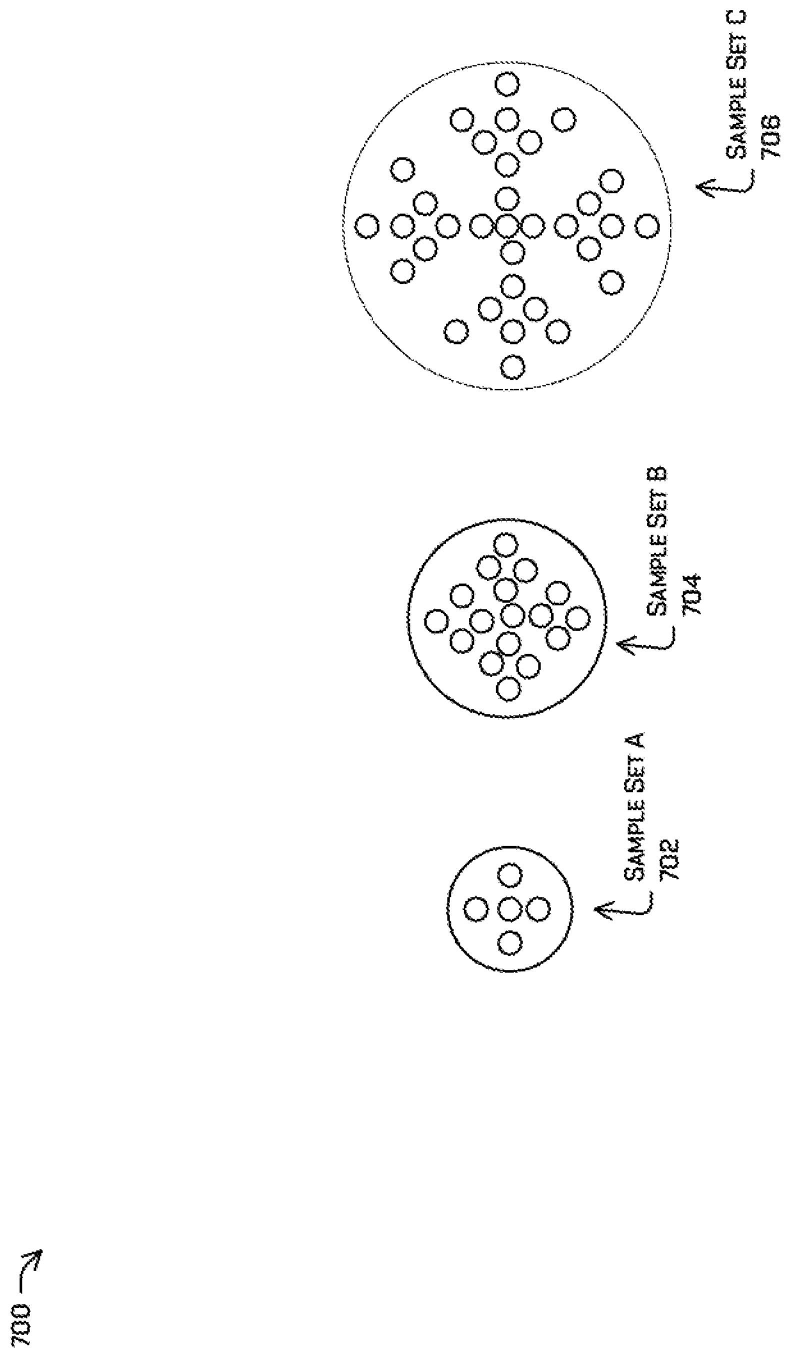
FIG. 7 provides an operational example of determining three sets of sampled states in a uniform manner.

FIG. 7 provides an operational example 700 of determining three sets of sampled states in a uniform manner. As depicted in FIG. 7, while set C 706 has more than the twice the number of sampled states as the set B 704 and set B 704 has more than twice the number of sampled states as the set A 702, all three sets are determined in a manner that associates a sampled state with a uniform probability density associated with the overall distribution (e.g., a uniform region of the probability distribution).

Figure 8:
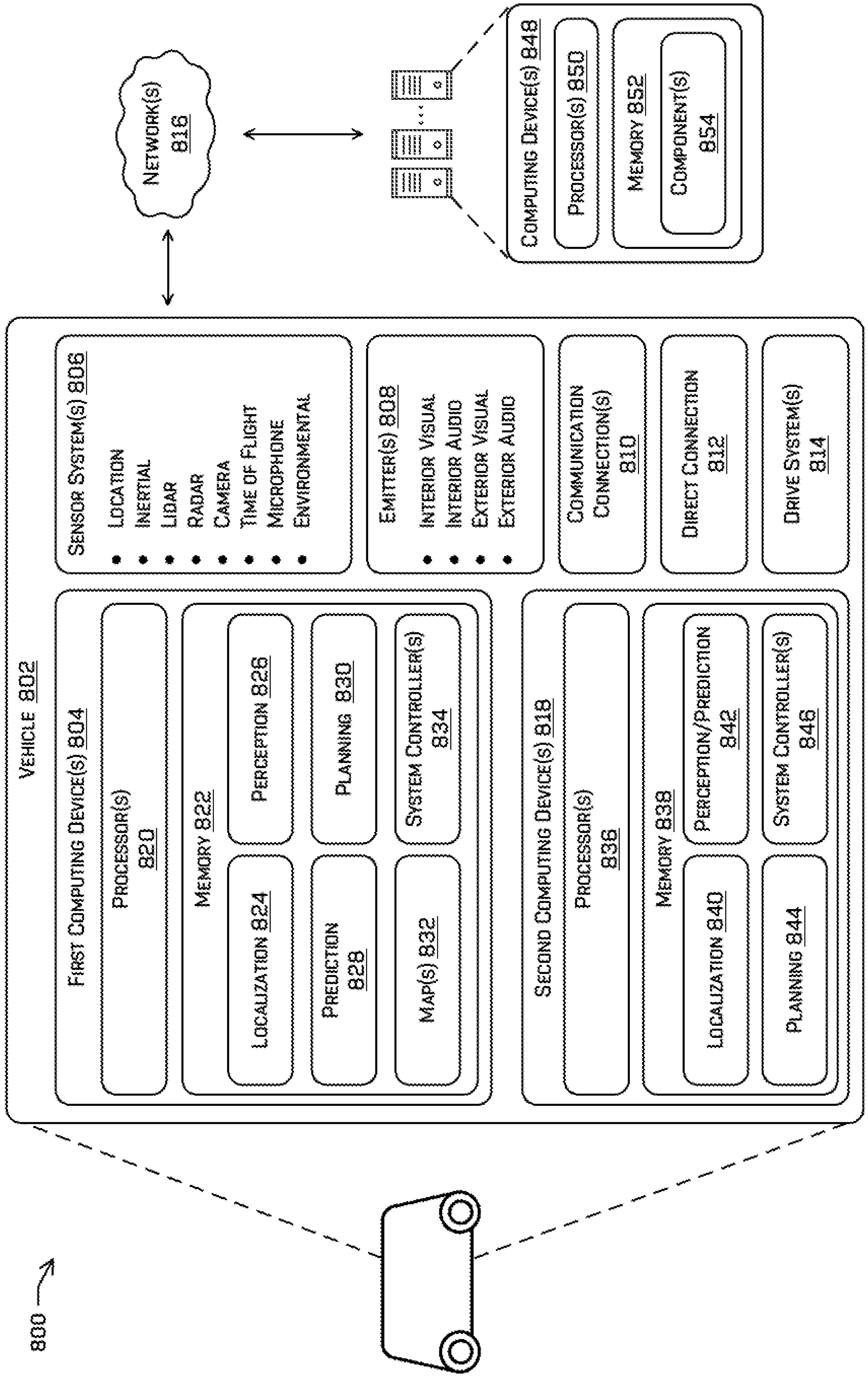
FIG. 8 is a block diagram of an example system for implementing the techniques described herein.

FIG. 8 is a block diagram of an example system 800 for implementing the techniques described herein. In at least one example, the system 800 can include a vehicle 802. In the illustrated example system 800, the vehicle 802 is an autonomous vehicle; however, the vehicle 802 can be any other type of vehicle.

The vehicle 802 can be a driverless vehicle, such as an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. In such examples, because the vehicle 802 can be configured to control all functions from start to completion of the trip, including all parking functions, it may not include a driver and/or controls for driving the vehicle 802, such as a steering wheel, an acceleration pedal, and/or a brake pedal. This is merely an example, and the systems and methods described herein may be incorporated into any ground-borne, airborne, or water-borne vehicle, including those ranging from vehicles that need to be manually controlled by a driver at all times, to those that are partially or fully autonomously controlled.

The vehicle 802 can include one or more first computing devices 804, one or more sensor system(s) 806, one or more emitters 808, one or more communication connections 810 (also referred to as communication devices and/or modems), at least one direct connection 812 (e.g., for physically coupling with the vehicle 802 to exchange data and/or to provide power), and one or more drive systems 814. The one or more sensor system(s) 806 can be configured to capture sensor data associated with an environment.

The sensor system(s) 806 can include time-of-flight sensors, location sensors (e.g., GPS, compass, etc.), inertial sensors (e.g., inertial measurement units (IMUs), accelerometers, magnetometers, gyroscopes, etc.), lidar sensors, radar sensors, sonar sensors, infrared sensors, cameras (e.g., RGB, IR, intensity, depth, etc.), microphone sensors, environmental sensors (e.g., temperature sensors, humidity sensors, light sensors, pressure sensors, etc.), ultrasonic transducers, wheel encoders, etc. The sensor system(s) 806 can include multiple instances of each of these or other types of sensors. For instance, the time-of-flight sensors can include individual time-of-flight sensors located at the corners, front, back, sides, and/or top of the vehicle 802. As another example, the camera sensors can include multiple cameras disposed at various locations about the exterior and/or interior of the vehicle 802. The sensor system(s) 806 can provide input to the first computing device(s) 804.

The vehicle 802 can also include emitter(s) 808 for emitting light and/or sound. The emitter(s) 808 in this example include interior audio and visual emitters to communicate with passengers of the vehicle 802. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The emitter(s) 808 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which may comprise acoustic beam steering technology.

The vehicle 802 can also include communication connection(s) 810 that enable communication between the vehicle 802 and one or more other local or remote computing device(s) (e.g., a remote teleoperation computing device) or remote services. For instance, the communication connection(s) 810 can facilitate communication with other local computing device(s) on the vehicle 802 and/or the drive system(s) 814. Also, the communication connection(s) 810 can allow the vehicle 802 to communicate with other nearby computing device(s) (e.g., other nearby vehicles, traffic signals, etc.).

The communications connection(s) 810 can include physical and/or logical interfaces for connecting the first computing device(s) 804 to another computing device or one or more external networks 816 (e.g., the Internet). For example, the communications connection(s) 810 can enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.), satellite communication, dedicated short-range communications (DSRC), or any suitable wired or wireless communications protocol that enables the respective computing device to interface with the other computing device(s).

In at least one example, the vehicle 802 can include drive system(s) 814. In some examples, the vehicle 802 can have a single drive system 814. In at least one example, if the vehicle 802 has multiple drive systems 814, individual drive systems 814 can be positioned on opposite ends of the vehicle 802 (e.g., the front and the rear, etc.). In at least one example, the drive system(s) 814 can include the sensor system(s) 806 to detect conditions of the drive system(s) 814 and/or the surroundings of the vehicle 802. By way of example and not limitation, the sensor system(s) 806 can include one or more wheel encoders (e.g., rotary encoders) to sense rotation of the wheels of the drive systems, inertial sensors (e.g., inertial measurement units, accelerometers, gyroscopes, magnetometers, etc.) to measure orientation and acceleration of the drive system, cameras or other image sensors, ultrasonic sensors to acoustically detect objects in the surroundings of the drive system, lidar sensors, radar sensors, etc. Some sensors, such as the wheel encoders can be unique to the drive system(s) 814. In some cases, the sensor system(s) 806 on the drive system(s) 814 can overlap or supplement corresponding systems of the vehicle 802 (e.g., sensor system(s) 806).

The drive system(s) 814 can include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 814 can include a drive system controller which can receive and preprocess data from the sensor system(s) 806 and to control operation of the various vehicle systems. In some examples, the drive system controller can include one or more processor(s) and memory communicatively coupled with the one or more processor(s). The memory can store one or more components to perform various functionalities of the drive system(s) 814. Furthermore, the drive system(s) 814 also include one or more communication connection(s) that enable communication by the respective drive system with one or more other local or remote computing device(s).

The vehicle 802 can include one or more second computing devices 818 to provide redundancy, error checking, and/or validation of determinations and/or commands determined by the first computing device(s) 804.

By way of example, the first computing device(s) 804 may be considered to be a primary system, while the second computing device(s) 818 may be considered to be a secondary system. The primary system may generally perform processing to control how the vehicle maneuvers within an environment. The primary system may implement various Artificial Intelligence (AI) techniques, such as machine learning, to understand an environment around the vehicle and/or instruct the vehicle to move within the environment.

For example, the primary system may implement the AI techniques to localize the vehicle, detect an object around the vehicle, segment sensor data, determine a classification of the object, predict an object track, generate a trajectory for the vehicle, and so on. In examples, the primary system processes data from multiple types of sensors on the vehicle, such as light detection and ranging (lidar) sensors, radar sensors, image sensors, depth sensors (time of flight, structured light, etc.), and the like.

The secondary system may validate an operation of the primary system and may take over control of the vehicle from the primary system when there is a problem with the primary system. The secondary system may implement probabilistic techniques that are based on positioning, velocity, acceleration, etc. of the vehicle and/or objects around the vehicle. For example, the secondary system may implement one or more probabilistic techniques to independently localize the vehicle (e.g., to a local environment), detect an object around the vehicle, segment sensor data, identify a classification of the object, predict an object track, generate a trajectory for the vehicle, and so on. In examples, the secondary system processes data from a few sensors, such as a subset of sensor data that is processed by the primary system. To illustrate, the primary system may process lidar data, radar data, image data, depth data, etc., while the secondary system may process just lidar data and/or radar data (and/or time of flight data). In other examples, however, the secondary system may process sensor data from any number of sensors, such as data from each of the sensors, data from the same number of sensors as the primary system, etc.

Additional examples of a vehicle architecture comprising a primary computing system and a secondary computing system can be found, for example, in U.S. patent application Ser. No. 16/189,726 titled "Perception Collision Avoidance" and filed Nov. 13, 2018, the entirety of which is herein incorporated by reference.

The first computing device(s) 804 can include one or more processors 820 and memory 822 communicatively coupled with the one or more processors 820. In the illustrated example, the memory 822 of the first computing device(s) 804 stores a localization component 824, a perception component 826, a prediction component 828, a planning component 830, one or more maps 832, and one or more system controllers 834. Though depicted as residing in the memory 822 for illustrative purposes, it is contemplated that the localization component 824, the perception component 828, the prediction component 828, the planning component 830, the maps 832, and the one or more system controllers 834 can additionally, or alternatively, be accessible to the first computing device(s) 804 (e.g., stored in a different component of vehicle 802 and/or be accessible to the vehicle 802 (e.g., stored remotely).

In memory 822 of the first computing device 804, the localization component 824 can include functionality to receive data from the sensor system(s) 806 to determine a position of the vehicle 802. For example, the localization component 824 can include and/or request/receive a three-dimensional map of an environment (and/or a map based on semantic objects) and can continuously determine a location of the autonomous vehicle within the map. In some instances, the localization component 824 can use SLAM (simultaneous localization and mapping) or CLAMS (calibration, localization and mapping, simultaneously) to receive time-of-flight data, image data, lidar data, radar data, sonar data, IMU data, GPS data, wheel encoder data, or any combination thereof, and the like to accurately determine a location of the autonomous vehicle. In some instances, the localization component 824 can provide data to various components of the vehicle 802 to determine an initial position of an autonomous vehicle for generating a trajectory, as discussed herein.

The perception component 826 can include functionality to perform object detection, segmentation, and/or classification. In some examples, the perception component 826 can provide processed sensor data that indicates a presence of an entity that is proximate to the vehicle 802 and/or a classification of the entity as an entity type (e.g., car, pedestrian, cyclist, building, tree, road surface, curb, sidewalk, unknown, etc.). In additional or alternative examples, the perception component 826 can provide processed sensor data that indicates one or more characteristics associated with a detected entity and/or the environment in which the entity is positioned. In some examples, characteristics associated with an entity can include, but are not limited to, an x-position (global position), a y-position (global position), a z-position (global position), an orientation, an entity type (e.g., a classification), a velocity of the entity, an extent of the entity (size), etc. Characteristics associated with the environment can include, but are not limited to, a presence of another entity in the environment, a state of another entity in the environment, a time of day, a day of a week, a season, a weather condition, an indication of darkness/light, etc.

As described above, the perception component 826 can use perception algorithms to determine a perception-based bounding box associated with an object in the environment based on sensor data. For example, the perception component 826 can receive image data and classify the image data to determine that an object is represented in the image data. Then, using detection algorithms, the perception component 826 can generate a two-dimensional bounding box and/or a perception-based three-dimensional bounding box associated with the object. The perception component 826 can further generate a three-dimensional bounding box associated with the object. As discussed above, the three-dimensional bounding box can provide additional information such as a location, orientation, pose, and/or size (e.g., length, width, height, etc.) associated with the object.

The perception component 826 can include functionality to store perception data generated by the perception component 826. In some instances, the perception component 826 can determine a track corresponding to an object that has been classified as an object type. For purposes of illustration only, the perception component 826, using sensor system(s) 806 can capture one or more images of an environment. The sensor system(s) 806 can capture images of an environment that includes an object, such as a pedestrian. The pedestrian can be at a first position at a time T and at a second position at time T+t (e.g., movement during a span of time t after time T). In other words, the pedestrian can move during this time span from the first position to the second position. Such movement can, for example, be logged as stored perception data associated with the object.

The stored perception data can, in some examples, include fused perception data captured by the vehicle 802. Fused perception data can include a fusion or other combination of sensor data from sensor system(s) 806, such as image sensors, lidar sensors, radar sensors, time-of-flight sensors, sonar sensors, global positioning system sensors, internal sensors, and/or any combination of these. The stored perception data can additionally or alternatively include classification data including semantic classifications of objects (e.g., pedestrians, vehicles, buildings, road surfaces, etc.) represented in the sensor data. The stored perception data can additionally or alternatively include a track data (positions, orientations, sensor features, etc.) corresponding to motion of objects classified as dynamic objects through the environment. The track data can include multiple tracks of multiple different objects over time. This track data can be mined to identify images of certain types of objects (e.g., pedestrians, animals, etc.) at times when the object is stationary (e.g., standing still) or moving (e.g., walking, running, etc.). In this example, the computing device determines a track corresponding to a pedestrian.

The prediction component 828 can generate one or more probability maps representing prediction probabilities of possible locations of one or more objects in an environment. For example, the prediction component 828 can generate one or more probability maps for vehicles, pedestrians, animals, and the like within a threshold distance from the vehicle 802. In some instances, the prediction component 828 can measure a track of an object and generate a discretized prediction probability map, a heat map, a probability distribution, a discretized probability distribution, and/or a trajectory for the object based on observed and predicted behavior. In some instances, the one or more probability maps can represent an intent of the one or more objects in the environment.

The planning component 830 can determine a path for the vehicle 802 to follow to traverse through an environment. For example, the planning component 830 can determine various routes and paths and various levels of detail. In some instances, the planning component 830 can determine a route to travel from a first location (e.g., a current location) to a second location (e.g., a target location). For the purpose of this discussion, a route can be a sequence of waypoints for traveling between two locations. As non-limiting examples, waypoints include streets, intersections, global positioning system (GPS) coordinates, etc. Further, the planning component 830 can generate instructions for guiding the autonomous vehicle along at least a portion of the route from the first location to the second location. In at least one example, the planning component 830 can determine how to guide the autonomous vehicle from a first waypoint in the sequence of waypoints to a second waypoint in the sequence of waypoints. In some examples, the instruction can be a path, or a portion of a path. In some examples, multiple paths can be substantially simultaneously generated (i.e., within technical tolerances) in accordance with a receding horizon technique. A single path of the multiple paths in a receding data horizon having the highest confidence level may be selected to operate the vehicle.

In other examples, the planning component 830 can alternatively, or additionally, use data from the perception component 826 and/or the prediction component 828 to determine a path for the vehicle 802 to follow to traverse through an environment. For example, the planning component 830 can receive data from the perception component 826 and/or the prediction component 828 regarding objects associated with an environment. Using this data, the planning component 830 can determine a route to travel from a first location (e.g., a current location) to a second location (e.g., a target location) to avoid objects in an environment. In at least some examples, such a planning component 830 may determine there is no such collision free path and, in turn, provide a path which brings vehicle 802 to a safe stop avoiding all collisions and/or otherwise mitigating damage.

The memory 822 can further include one or more maps 832 that can be used by the vehicle 802 to navigate within the environment. For the purpose of this discussion, a map can be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map can include, but is not limited to: texture information (e.g., color information (e.g., RGB color information, Lab color information, HSV/HSL color information), and the like), intensity information (e.g., LIDAR information, RADAR information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map can include a three-dimensional mesh of the environment. In some instances, the map can be stored in a tiled format, such that individual tiles of the map represent a discrete portion of an environment, and can be loaded into working memory as needed, as discussed herein. In at least one example, the one or more maps 832 can include at least one map (e.g., images and/or a mesh). In some examples, the vehicle 802 can be controlled based at least in part on the map(s) 832. That is, the map(s) 832 can be used in connection with the localization component 824, the perception component 826, the prediction component 828, and/or the planning component 830 to determine a location of the vehicle 802, identify objects in an environment, generate prediction probabilit(ies) associated with objects and/or the vehicle 802, and/or generate routes and/or trajectories to navigate within an environment.

In some examples, the one or more maps 832 can be stored on a remote computing device(s) (such as the computing device(s) 848) accessible via network(s) 816. In some examples, multiple maps 832 can be stored based on, for example, a characteristic (e.g., type of entity, time of day, day of week, season of the year, etc.). Storing multiple maps 832 can have similar memory requirements but can increase the speed at which data in a map can be accessed.

In at least one example, the first computing device(s) 804 can include one or more system controller(s) 834, which can be configured to control steering, propulsion, braking, safety, emitters, communication, and other systems of the vehicle 802. These system controller(s) 834 can communicate with and/or control corresponding systems of the drive system(s) 814 and/or other components of the vehicle 802, which may be configured to operate in accordance with a path provided from the planning component 830.

The second computing device(s) 818 can comprise one or more processors 836 and memory 838 including components to verify and/or control aspects of the vehicle 802, as discussed herein. In at least one instance, the one or more processors 836 can be similar to the processor(s) 820 and the memory 838 can be similar to the memory 822. However, in some examples, the processor(s) 836 and the memory 838 may comprise different hardware than the processor(s) 820 and the memory 822 for additional redundancy.

In some examples, the memory 838 can comprise a localization component 840, a perception/prediction component 842, a planning component 844, and one or more system controllers 846.

In some examples, the localization component 840 may receive sensor data from the sensor system(s) 806 to determine one or more of a position and/or orientation (together a pose) of the autonomous vehicle 802. Here, the position and/or orientation may be relative to point(s) and/or object(s) in an environment in which the autonomous vehicle 802 is located. In examples, the orientation may include an indication of a yaw, roll, and/or pitch of the autonomous vehicle 802 relative to a reference plane and/or relative to point(s) and/or object(s). In examples, the localization component 840 may perform less processing than the localization component 824 of the first computing device(s) 804 (e.g., higher-level localization). For instance, the localization component 840 may not determine a pose of the autonomous vehicle 802 relative to a map, but merely determine a pose of the autonomous vehicle 802 relative to objects and/or surfaces that are detected around the autonomous vehicle 802 (e.g., a local position and not a global position). Such a position and/or orientation may be determined, for example, using probabilistic filtering techniques, such as, for example, Bayesian filters (Kalman filters, extended Kalman filters, unscented Kalman filters, etc.) using some or all of the sensor data.

In some examples, the perception/prediction component 842 can include functionality to detect, identify, classify, and/or track object(s) represented in sensor data. For example, the perception/prediction component 842 can perform the clustering operations and operations to estimate or determine connectivity data associated with data points, as discussed herein.

In some examples, the perception/prediction component 842 may comprise an M-estimator, but may lack an object classifier such as, for example, a neural network, decision tree, and/or the like for classifying objects. In additional or alternate examples, the perception/prediction component 842 may comprise an ML model of any type, configured to disambiguate classifications of objects. By contrast, the perception component 826 may comprise a pipeline of hardware and/or software components, which may comprise one or more machine-learning models, Bayesian filters (e.g., Kalman filters), graphics processing unit(s) (GPU(s)), and/or the like. In some examples, the perception data determined by the perception/prediction component 842 (and/or 826) may comprise object detections (e.g., identifications of sensor data associated with objects in an environment surrounding the autonomous vehicle), object classifications (e.g., identifications of an object type associated with detected objects), object tracks (e.g., historical, current, and/or predicted object position, velocity, acceleration, and/or heading), and/or the like.

The prediction component of the second computing device 818 may also process the input data to determine one or more predicted trajectories for an object. For example, based on a current position of an object and a velocity of the object over a period of a few seconds, the prediction component may predict a path that the object will move over the next few seconds. In some examples, such a predicted path may comprise using linear assumptions of motion given a position, orientation, velocity, and/or orientation. In other examples, such predicted paths may comprise more complex analyses.

In some examples, the planning component 844 can include functionality to receive a trajectory from the planning component 830 to validate that the trajectory is free of collisions and/or is within safety margins. In some examples, the planning component 844 can generate a safe stop trajectory (e.g., a trajectory to stop the vehicle 802 with a "comfortable" deacceleration (e.g., less than maximum deceleration)) and in some examples the planning component 844 can generate an emergency stop trajectory (e.g., maximum deceleration with or without steering inputs).

In some examples, the system controller(s) 846 can include functionality to control safety critical components (e.g., steering, braking, motors, etc.) of the vehicle. In this manner, the second computing device(s) 818 can provide redundancy and/or an additional hardware and software layer for vehicle safety.

The vehicle 802 can connect to computing device(s) 848 via the network 816 and can include one or more processors 850 and memory 852 communicatively coupled with the one or more processors 850. In at least one instance, the one or more processors 850 can be similar to the processor(s) 820 and the memory 852 can be similar to the memory 822. In the illustrated example, the memory 852 of the computing device(s) 848 stores a component(s) 854, which may correspond to any of the components discussed herein.

The processor(s) 820, 836, and/or 850 can be any suitable processor capable of executing instructions to process data and perform operations as described herein. By way of example and not limitation, the processor(s) 820, 836, and/or 850 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

The memory 822, 838, and/or 852 are examples of non-transitory computer-readable media. The memory 822, 838, and/or 852 can store an operating system and one or more software applications, instructions, programs, and/or data to implement the methods described herein and the functions attributed to the various systems. In various implementations, the memory 822, 838, and/or 852 can be implemented using any suitable memory technology, such as static random-access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

In some instances, aspects of some or all of the components discussed herein can include any models, algorithms, and/or machine-learning algorithms. For example, in some instances, the components in the memory 822, 838, and/or 852 can be implemented as a neural network. In some examples, the components in the memory 822, 838, and/or 852 may not include machine learning algorithm to reduce complexity and to be verified and/or certified from a safety standpoint.

As described herein, an exemplary neural network is an algorithm which passes input data through a series of connected layers to produce an output. Each layer in a neural network can also comprise another neural network or can comprise any number of layers (whether convolutional or not). As can be understood in the context of this disclosure, a neural network can utilize machine learning, which can refer to a broad class of such algorithms in which an output is generated based on learned parameters.

Although discussed in the context of neural networks, any type of machine learning can be used consistent with this disclosure. For example, machine learning or machine-learned algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

Additional examples of architectures include neural networks such as ResNet50, ResNet101, VGG, DenseNet, PointNet, and the like.

The methods described herein represent sequences of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes. In some embodiments, one or more operations of the method may be omitted entirely. Moreover, the methods described herein can be combined in whole or in part with each other or with other methods.

The various techniques described herein may be implemented in the context of computer-executable instructions or software, such as program modules, which are stored in computer-readable storage and executed by the processor(s) of one or more computing devices such as those illustrated in the figures. Generally, program modules include routines, programs, objects, components, data structures, etc., and define operating logic for performing particular tasks or implementing particular abstract data types.

Other architectures may be used to implement the described functionality and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

EXAMPLE CLAUSES

While the example clauses described below are described with respect to one particular implementation, it should be understood that, in the context of this document, the content of the example clauses can also be implemented via a method, device, system, computer-readable medium, and/or another implementation. Additionally, any of examples A-T may be implemented alone or in combination with any other one or more of the examples A-T.

A: A system comprising: one or more processors; and one or more non-transitory computer-readable media storing computer-executable instructions that, when executed, cause the system to perform operations comprising: receiving a candidate trajectory associated with an autonomous vehicle; receiving data associated with an object in an environment of the autonomous vehicle; determining, for the object, a set of parameters associated with a distribution of a predicted state of the object at a future time after a current time; determining, based at least in part on the candidate trajectory and a first parameter of the set of parameters, first data representing that a first sampled state is predicted to lead to collision, wherein the first sampled state is determined based at least in part on the first parameter; determining a second distribution associated with a second predicted state of the object at a second time; determining a cost associated with the candidate trajectory based at least in part on the first data; and controlling the autonomous vehicle based at least in part on the cost.

B: The system of paragraph A, wherein the set of parameters comprise a first set of sigma points determined based at least in part on the distribution.

C: The system of paragraph B, wherein determining the set of parameters comprises: determining a covariance associated with the distribution; and determining, based at least in part on the covariance, to determine a numerosity of the first set of sigma points.

D: The system of paragraph B or C, wherein: the first set of sigma points are uniformly distributed, and determining the first data representing that the first sampled state is predicted to lead to collision is determined based at least in part on a sum of probabilities associated with the distribution within a range of a first sigma point from the first set of sigma points.

E: The system of any of paragraphs A-D, the operations further comprising: determining, based at least in part on the distribution, that the predicted state of the autonomous vehicle is inside an ellipse associated with a threshold probability of a location of the object.

F: One or more non-transitory computer-readable media storing instructions executable by one or more processors, wherein the instructions, when executed, cause the one or more processors to perform operations comprising: receiving a candidate trajectory associated with a vehicle; determining a distribution associated with a predicted state of an object in an environment of the vehicle, the distribution associated with a first set of parameters; determining a first sampled state based at least in part on the first set of parameters; determining, based at least in part on the distribution and the first sampled state, first data representing that the first sampled state is predicted to collide with the candidate trajectory; determining a second sampled state based at least in part on the first set of parameters; determining second data representing that the second sampled state is predicted to collide with the candidate trajectory; determining a likelihood of collision based at least in part on the first data and the second data; and controlling the vehicle based at least in part on the likelihood of collision.

G: The one or more non-transitory computer-readable media of paragraph F, wherein: the first set of parameters comprise a set of sigma points, and a numerosity of the set of sigma points is based at least in part on a covariance associated with the distribution.

H: The one or more non-transitory computer-readable media of paragraph F or G, wherein: the distribution is a first distribution at a first time, the first set of parameters comprises a first set of sigma points, and the operations further comprise: determining a second distribution at a second time; determining a second set of sigma points associated with the second distribution; determining the second distribution has a higher covariance than the first distribution; and mapping data associated with a first sigma point of the first set of sigma points to a second sigma point, wherein determining the likelihood of collision is further based at least in part on the data.

I: The one or more non-transitory computer-readable media of paragraph H, wherein: the first set of sigma points are associated with a first count, the second set of sigma points are associated with a second count, and the second count is determined based at least in part on applying a power of two to the first count.

J: The one or more non-transitory computer-readable media of any of paragraphs F-I, wherein: the first set of parameters comprises a first set of sigma points, the first set of sigma points are uniformly distributed about a mean of a Gaussian, and a probability associated with a first sigma point in the first set of sigma points is determined based at least in part on the distribution within a range of the first sigma point.

K: The one or more non-transitory computer-readable media of any of paragraphs F-J, the operations further comprising: determining, based at least in part on the distribution, that the first sampled state of the vehicle is inside an ellipse associated with a threshold probability of a location of the object.

L: The one or more non-transitory computer-readable media of paragraph H, the operations further comprising: determining a first set of sampled states based at least in part on the second distribution; determining a first subset of the first set of sampled states that are predicted to lead to collision; and determining a collision probability associated with the second time based at least in part on a first probability associated with the first set of sampled states and a second probability associated with the first subset.

M: The one or more non-transitory computer-readable media of any of paragraphs F-L, wherein the first set of parameters comprise a set of uniformly spaced sigma points, and wherein determining the likelihood of collision is based at least in part on a sum of probabilities associated with sigma points associated with a collision.

N: The one or more non-transitory computer-readable media of any of paragraphs F-M, wherein: the candidate trajectory is determined by a first computing device associated with the vehicle, the operations are performed by a second computing device that is configured to validate an output of the first computing device, and the second computing device is configured to cause the vehicle to perform a safety maneuver based at least in part on the likelihood of collision meeting or exceeding a threshold value.

O: The one or more non-transitory computer-readable media of any of paragraphs F-N, the operations further comprising: determining a second distribution associated with a second predicted state of the object at a second time, the second distribution associated with a second set of parameters; and determining the second sampled state based at least in part on the second distribution.

P: A method comprising: receiving a candidate trajectory associated with a vehicle; determining a distribution associated with a predicted state of an object in an environment of the vehicle, the distribution associated with a first set of parameters; determining a first sampled state based at least in part on the first set of parameters; determining, based at least in part on the distribution and the first sampled state, first data representing that the first sampled state is predicted to collide with the candidate trajectory; determining a second sampled state based at least in part on the first set of parameters; determining second data representing that the second sampled state is predicted to collide with the candidate trajectory; determining a likelihood of collision based at least in part on the first data and the second data; and controlling the vehicle based at least in part on the likelihood of collision.

Q: The method of paragraph P, wherein: the first set of parameters comprise a set of sigma points, and a numerosity of the set of sigma points is based at least in part on a covariance associated with the distribution.

R: The method of paragraph P or Q, wherein: the distribution is a first distribution at a first time, the first set of parameters comprises a first set of sigma points, and the method further comprising: determining a second distribution at a second time; determining a second set of sigma points associated with the second distribution; determining the second distribution has a higher covariance than the first distribution; and mapping data associated with a first sigma point of the first set of sigma points to a second sigma point, wherein determining the likelihood of collision is further based at least in part on the data.

S: The method of paragraph R, wherein: the first set of sigma points are associated with a first count, the second set of sigma points are associated with a second count, and the second count is determined based at least in part on applying a power of two to the first count.

T: The method of any of paragraphs P-S, wherein: the first set of parameters comprises a first set of sigma points, the first set of sigma points are uniformly distributed about a mean of a Gaussian, and a probability associated with a first sigma point in the first set of sigma points is determined based at least in part on the distribution within a range of the first sigma point.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A system comprising:

one or more processors; and one or more non-transitory computer-readable media storing computer-executable instructions that, when executed, cause the system to perform operations comprising:

receiving a candidate trajectory associated with an autonomous vehicle;

receiving data associated with an object in an environment of the autonomous vehicle;

determining, for the object, a first set of sigma points associated with a first distribution of a predicted state of the object at a first time after a current time;

determining, based at least in part on the candidate trajectory and a first sigma point of the first set of sigma points, first data representing that a first sampled state is predicted to lead to collision, wherein the first sampled state is determined based at least in part on the first sigma point;

determining a second distribution associated with a second predicted state of the object at a second time;

determining a second set of sigma points associated with the second distribution;

determining a first covariance of the first distribution and a second covariance of the second distribution;

determining that the second covariance indicates a greater uncertainty than the first covariance;

mapping second data associated with the first sigma point of the first set of sigma points to a second sigma point of the second set of sigma points;

determining a cost associated with the candidate trajectory based at least in part on the first data and the second data; and controlling the autonomous vehicle based at least in part on the cost.

2. The system of claim 1, wherein determining the first set of sigma points comprises:

determining, based at least in part on the first covariance, a numerosity of the first set of sigma points.

3. The system of claim 1, wherein:

the first set of sigma points are uniformly distributed, and determining the first data representing that the first sampled state is predicted to lead to collision is determined based at least in part on a sum of probabilities associated with the first distribution within a range of a third sigma point from the first set of sigma points.

4. The system of claim 1, the operations further comprising:

determining, based at least in part on the first distribution, that the predicted state of the autonomous vehicle is inside an ellipse associated with a threshold probability of a location of the object.

5. One or more non-transitory computer-readable media storing instructions executable by one or more processors, wherein the instructions, when executed, cause the one or more processors to perform operations comprising:

receiving a candidate trajectory associated with a vehicle;

determining a first distribution at a first time, the first distribution:

associated with a predicted state of an object in an environment of the vehicle, and associated with a first set of sigma points;

determining a first sampled state based at least in part on the first set of sigma points;

determining, based at least in part on the first distribution and the first sampled state, first data representing that the first sampled state is predicted to collide with the candidate trajectory;

determining a second sampled state based at least in part on the first set of sigma points;

determining second data representing that the second sampled state is predicted to collide with the candidate trajectory;

determining a second distribution at a second time;

determining a second set of sigma points associated with the second distribution;

determining a first covariance of the first distribution and a second covariance of the second distribution;

determining that the second covariance indicates a greater uncertainty than the first covariance;

mapping third data associated with a first sigma point of the first set of sigma points to a second sigma point;

determining a likelihood of collision based at least in part on the first data, the second data, and the third data; and controlling the vehicle based at least in part on the likelihood of collision.

6. The one or more non-transitory computer-readable media of claim 5, wherein:

a numerosity of the first set of sigma points is based at least in part on a covariance associated with the first distribution.

7. The one or more non-transitory computer-readable media of claim 5, wherein:

the first set of sigma points are associated with a first count, the second set of sigma points are associated with a second count, and the second count is determined based at least in part on applying a power of two to the first count.

8. The one or more non-transitory computer-readable media of claim 5, wherein:

the first set of sigma points are uniformly distributed about a mean of a Gaussian, and a probability associated with a third sigma point in the first set of sigma points is determined based at least in part on the first distribution within a range of the third sigma point.

9. The one or more non-transitory computer-readable media of claim 5, the operations further comprising:

determining, based at least in part on the first distribution, that the first sampled state of the vehicle is inside an ellipse associated with a threshold probability of a location of the object.

10. The one or more non-transitory computer-readable media of claim 5, the operations further comprising:

determining a first set of sampled states based at least in part on the second distribution;

determining a first subset of the first set of sampled states that are predicted to lead to collision; and determining a collision probability associated with the second time based at least in part on a first probability associated with the first set of sampled states and a second probability associated with the first subset.

11. The one or more non-transitory computer-readable media of claim 5, wherein the first set of sigma points are uniformly spaced, and wherein determining the likelihood of collision is based at least in part on a sum of probabilities associated with sigma points associated with a collision.

12. The one or more non-transitory computer-readable media of claim 5, wherein:

the candidate trajectory is determined by a first computing device associated with the vehicle, the operations are performed by a second computing device that is configured to validate an output of the first computing device, and the second computing device is configured to cause the vehicle to perform a safety maneuver based at least in part on the likelihood of collision meeting or exceeding a threshold value.

13. The one or more non-transitory computer-readable media of claim 5, the operations further comprising:

determining a third distribution associated with a second predicted state of the object at a third time, the third distribution associated with a third set of parameters; and determining a third sampled state based at least in part on the third distribution.

14. A method comprising:

receiving a candidate trajectory associated with a vehicle;

determining a first distribution associated with a predicted state of an object in an environment of the vehicle at a first time, the first distribution associated with a first set of sigma points;

determining a first sampled state based at least in part on the first set of sigma points;

determining, based at least in part on the first distribution and the first sampled state, first data representing that the first sampled state is predicted to collide with the candidate trajectory;

determining a second sampled state based at least in part on the first set of sigma points;

determining second data representing that the second sampled state is predicted to collide with the candidate trajectory;

determining a second distribution at a second time;

determining a second set of sigma points associated with the second distribution;

determining a first covariance of the first distribution and a second covariance of the second distribution;

determining that the second covariance indicates a greater uncertainty than the first covariance;

mapping third data associated with a first sigma point of the first set of sigma points to a second sigma point;

determining a likelihood of collision based at least in part on the first data, the second data, and the third data; and controlling the vehicle based at least in part on the likelihood of collision.

15. The method of claim 14, wherein a numerosity of the first set of sigma points is based at least in part on a covariance associated with the first distribution.

16. The method of claim 14, wherein:

the first set of sigma points are associated with a first count, the second set of sigma points are associated with a second count, and the second count is determined based at least in part on applying a power of two to the first count.

17. The method of claim 14, wherein:

the first set of sigma points are uniformly distributed about a mean of a Gaussian, and a probability associated with a third sigma point in the first set of sigma points is determined based at least in part on the first distribution within a range of the third sigma point.

18. The one or more non-transitory computer-readable media of claim 5, wherein determining that the first sampled state is predicted to collide with the candidate trajectory is based at least in part on determining that the first sampled state is a predicted extension of a third sampled state associated with a third time prior to the first time that was predicted to collide with the candidate trajectory at the third time.

19. The method of claim 14, wherein determining that the first sampled state is predicted to collide with the candidate trajectory is based at least in part on determining that a first region associated with a position of the first sampled state intersects with a second region associated with a position of the candidate trajectory at the first time.

20. The system of claim 1, wherein determining that the first sampled state is predicted to lead to collision is based at least in part on determining that a distance associated with a position of the first sampled state and a position of the candidate trajectory at the first time fails to exceed a threshold.

* * * * *